United States Patent
Watanabe et al.

(10) Patent No.: US 12,543,511 B2
(45) Date of Patent: Feb. 3, 2026

(54) QUANTUM DEVICE

(71) Applicant: NEC Corporation, Tokyo (JP)

(72) Inventors: Suguru Watanabe, Tokyo (JP); Kunihiko Ishihara, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 884 days.

(21) Appl. No.: 17/850,052

(22) Filed: Jun. 27, 2022

(65) Prior Publication Data

US 2023/0008193 A1  Jan. 12, 2023

(30) Foreign Application Priority Data

Jul. 9, 2021  (JP) .................. 2021-114360

(51) Int. Cl.
*H10N 60/12*  (2023.01)
*G06N 10/40*  (2022.01)

(52) U.S. Cl.
CPC ........... *H10N 60/124* (2023.02); *G06N 10/40* (2022.01)

(58) Field of Classification Search
CPC .............................. H01N 60/124; G06N 10/40
USPC ......................................................... 505/190
See application file for complete search history.

(56) References Cited

U.S. PATENT DOCUMENTS

| | | | |
|---|---|---|---|
| 9,971,970 B1 * | 5/2018 | Rigetti | H01L 21/76898 |
| 2006/0199405 A1 | 9/2006 | Sato et al. | |
| 2007/0293062 A1 | 12/2007 | Sato et al. | |
| 2011/0102009 A1 * | 5/2011 | Lee | G01R 1/0491 29/877 |
| 2017/0110820 A1 * | 4/2017 | Chui | H01R 13/2421 |
| 2019/0044045 A1 * | 2/2019 | Thomas | H10D 48/3835 |
| 2020/0251837 A1 * | 8/2020 | Eicher | H01R 4/58 |
| 2021/0296559 A1 | 9/2021 | Spring et al. | |

FOREIGN PATENT DOCUMENTS

| | | |
|---|---|---|
| JP | 2002-148306 A | 5/2002 |
| JP | 2004-119945 A | 4/2004 |
| JP | 2004-335450 A | 11/2004 |
| JP | 2004-335534 A | 11/2004 |
| JP | 2020-038976 A | 3/2020 |
| JP | 2021-534583 A | 12/2021 |

OTHER PUBLICATIONS

JP Official Communication for JP Application No. 2021-114360, mailed on Jul. 22, 2025 with English Translation.

* cited by examiner

*Primary Examiner* — Dale E Page
(74) *Attorney, Agent, or Firm* — Sughrue Mion, PLLC

(57) ABSTRACT

A quantum device capable of preventing contacts from being displaced is provided. A quantum device includes a quantum element in which a quantum circuit is provided, a socket including contacts and a housing, the contacts being in contact with a terminal of the quantum element, and the housing supporting the contacts, and a board including a board substrate. At least one of the housing and the board substrate includes a hole, another one of the housing and the board substrate includes a fixing part disposed inside the hole and a body part other than the fixing part, and the fixing part and the body part are integrally formed.

20 Claims, 23 Drawing Sheets

QUANTUM DEVICE

INCORPORATION BY REFERENCE

This application is based upon and claims the benefit of priority from Japanese patent application No. 2021-114360, filed on Jul. 9, 2021, the disclosure of which is incorporated herein in its entirety by reference.

TECHNICAL FIELD

The present disclosure relates to a quantum device.

BACKGROUND ART

Japanese Unexamined Patent Application Publication Nos. 2002-148306, 2004-335534, and 2004-119945 describe measurement devices having a socket structure in which an electronic circuit unit and an evaluation substrate are connected by contacts (movable pins). Japanese Unexamined Patent Application Publication No. 2020-038976 describes a quantum device including a quantum circuit.

Quantum computers require the use of superconducting phenomena and stable electrical connections from a room temperature to an extremely low temperature. However, for example, in the configuration of Japanese Unexamined Patent Application Publication Nos. 2002-148306, 2004-335534, and 2004-119945, when the temperature is low, a difference between a linear expansion coefficient of a socket housing which is most thermally shrinkable and those of other materials such as a board may cause a cumulative error due to thermal shrinkage or a combination of a plurality of members, and thus the electrical connection may be disconnected.

In order to reduce the maximum value of an amount of displacement of the contacts with respect to the quantum chip/interposer and the board, it is necessary to control a contraction direction and a contraction amount, but such a regulation is not mentioned in Japanese Unexamined Patent Publication Nos. 2002-148306, 2004-335534, and 2004-119945.

SUMMARY

The present disclosure has been made to solve above-described problem, and one of the objects thereof is to provide a quantum device capable of preventing contacts from being displaced.

In an example aspect, a quantum device includes: a superconductive element including a superconductive material; a socket including a contact and a housing, the contact being in contact with a terminal of the superconductive element, and the housing supporting the contact; and a board including a board substrate. At least one of the housing and the board substrate includes a hole, another one of the housing and the board substrate includes a fixing part disposed inside the hole and a body part other than the fixing part, and the fixing part and the body part are integrally formed.

In another example aspect, a quantum device includes: a superconductive element including a superconductive material; a socket including a contact and a housing, the contact being in contact with a terminal of the superconductive element, and the housing supporting the contact; and a board including a board substrate. A part of at least one of the superconductive element, the housing, and the board substrate comes into contact with a cooling base having a cooling function, at least one of the housing and the board substrate includes a first hole, another one of the housing and the board substrate includes a first fixing part disposed inside the first hole and a first body part other than the first fixing part, the first fixing part and the first body part are integrally formed, at least one of the cooling base and the board substrate includes a second hole, another one of the cooling base and the board substrate includes a second fixing part disposed inside the second hole and a second body part other than the second fixing part, and the second fixing part and the second body part are integrally formed.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Figure 1:
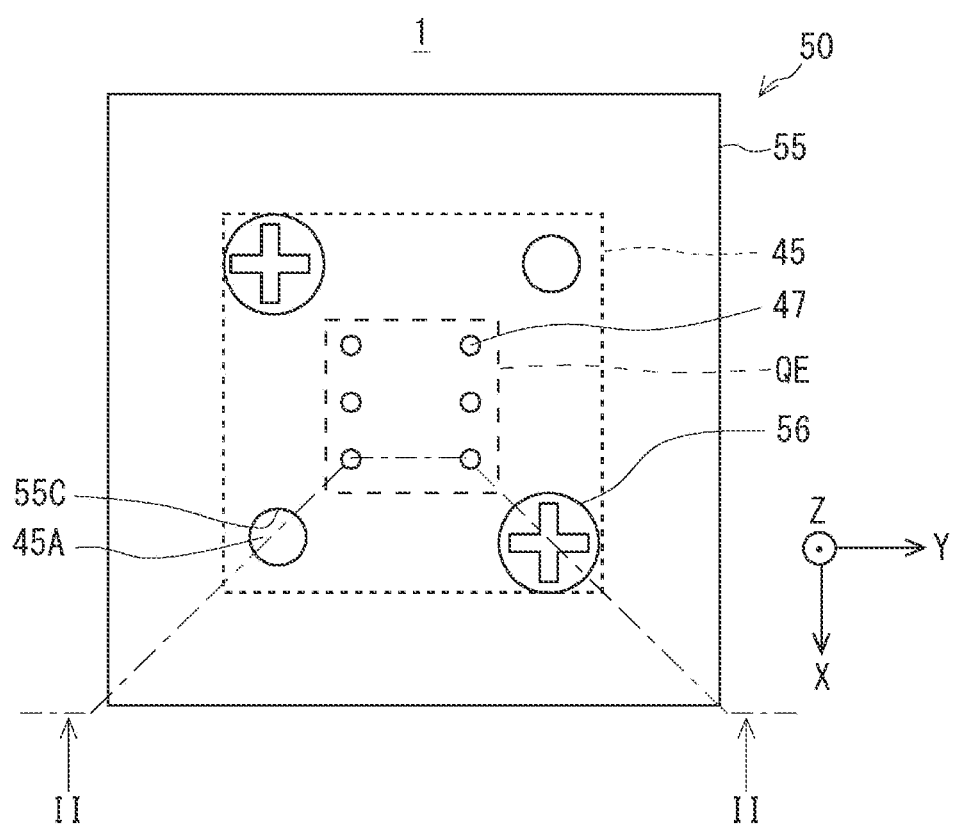
FIG. 1 is a plan view showing an example of a configuration of a quantum device according to a first example embodiment.

The following description and the drawings are partially omitted and simplified as appropriate for clarifying the explanation. Further, the same elements are denoted by the same reference numerals (or symbols) throughout the drawings, and redundant descriptions thereof are omitted as appropriate.

First Example Embodiment

A quantum device according to a first example embodiment will be described. The quantum device according to this example embodiment includes a quantum element that uses superconductivity in the field of quantum computing, a socket, and a board. The quantum computing is a technical field in which data is manipulated by using a quantum mechanical phenomenon (i.e., by using qubits). The quantum mechanical phenomenon is, for example, superposition of a plurality of states (i.e., a phenomenon in which a quantum variable simultaneously assumes a plurality of different states) or entanglement (i.e., a state in which a plurality of quantum variables are related to each other irrespective of the space or the time). In a quantum element, a quantum circuit that generates a qubit is provided.

First, as the configuration of the quantum device, <Quantum Element>, <Socket>, and <Board> will be described. A cooling base for cooling quantum devices will be also described. Next, <Comparative Example> will be described, and the effect of the quantum device according to this example embodiment will be described in comparison with Comparative Example.

<Quantum Element>

Figure 2:
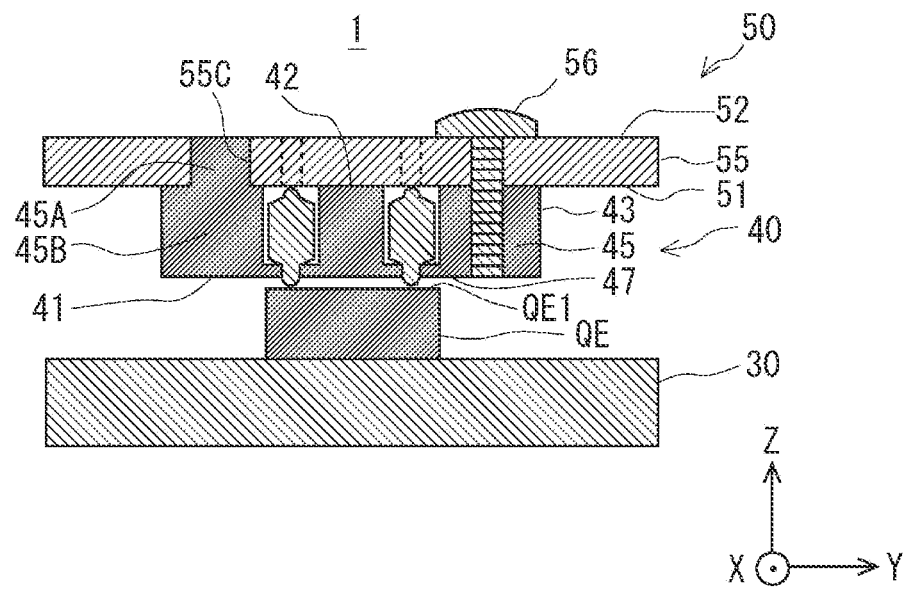
FIG. 2 is a cross-sectional view showing an example of a configuration of the quantum device according to the first example embodiment, showing a cross section taken along the line II-II of FIG. 1.

FIG. 1 is a plan view showing an example of a configuration of a quantum device according to the first example embodiment. FIG. 2 is a cross-sectional view showing an example of the configuration of the quantum device according to the first example embodiment, showing a cross section taken along the line II-II of FIG. 1. As shown in FIGS. 1 and 2, a quantum device 1 includes a superconductive element, a socket 40, and a board 50. In this example embodiment, a quantum element QE will be used as an example of a superconductive element that includes a superconductive material and operates under a superconducting state. Thus, in this example embodiment, the superconductive element is the quantum element QE. The superconductive element includes a superconductive material and is not limited to the quantum element QE as long as the element operates under a superconducting state. The quantum element QE is in contact with the cooling base 30.

Note that an XYZ-orthogonal coordinate system is used for facilitating the explanation of the quantum device 1. A lower surface of the quantum element QE in contact with the cooling base 30 is defined as an XY-plane, and a direction orthogonal to the XY-plane is defined as a Z-axis direction. The Z-axis positive direction is referred to as an upward direction and the Z-axis negative direction is referred to as a downward direction. Note that the terms "upward" and "downward" are used just for the explanatory purpose, and do not indicate the directions in which the actual quantum device 1 is positioned when it is used.

The quantum element QE is disposed on the cooling base 30. The surface of the quantum element QE on the Z-axis positive direction side is called a terminal surface QE1. A terminal of the quantum element QE is formed on the terminal surface QE1. The quantum element QE may include one or more quantum chips or one or more quantum chips and one or more interposers. When the quantum element QE includes only a quantum chip(s), the quantum chip(s) has the terminal surface QE1. If the quantum element QE includes a quantum chip(s) and an interposer(s), the interposer(s) may have the terminal surface QE1.

The quantum element QE is provided with a quantum circuit. For example, the quantum chip includes at least a part of the quantum circuit. The interposer may not include a quantum circuit or may include a part of a quantum circuit. The quantum element QE may include a plurality of quantum chips or may include a plurality of interposers. In the quantum element QE, the plurality of quantum chips may be stacked in the Z-axis direction or arranged side by side on the XY-plane. In the quantum element QE, the plurality of interposers may be stacked in the Z-axis direction or arranged side by side on the XY-plane. A case where the quantum element QE includes one quantum chip and one interposer will be described below.

Figure 3:
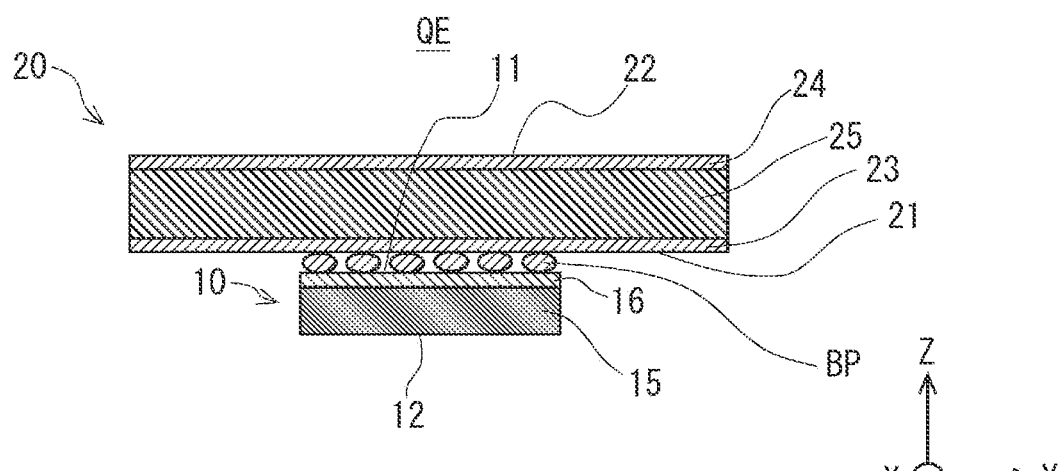
FIG. 3 is a cross-sectional view showing an example of a quantum element according to the first example embodiment.
Figure 4:
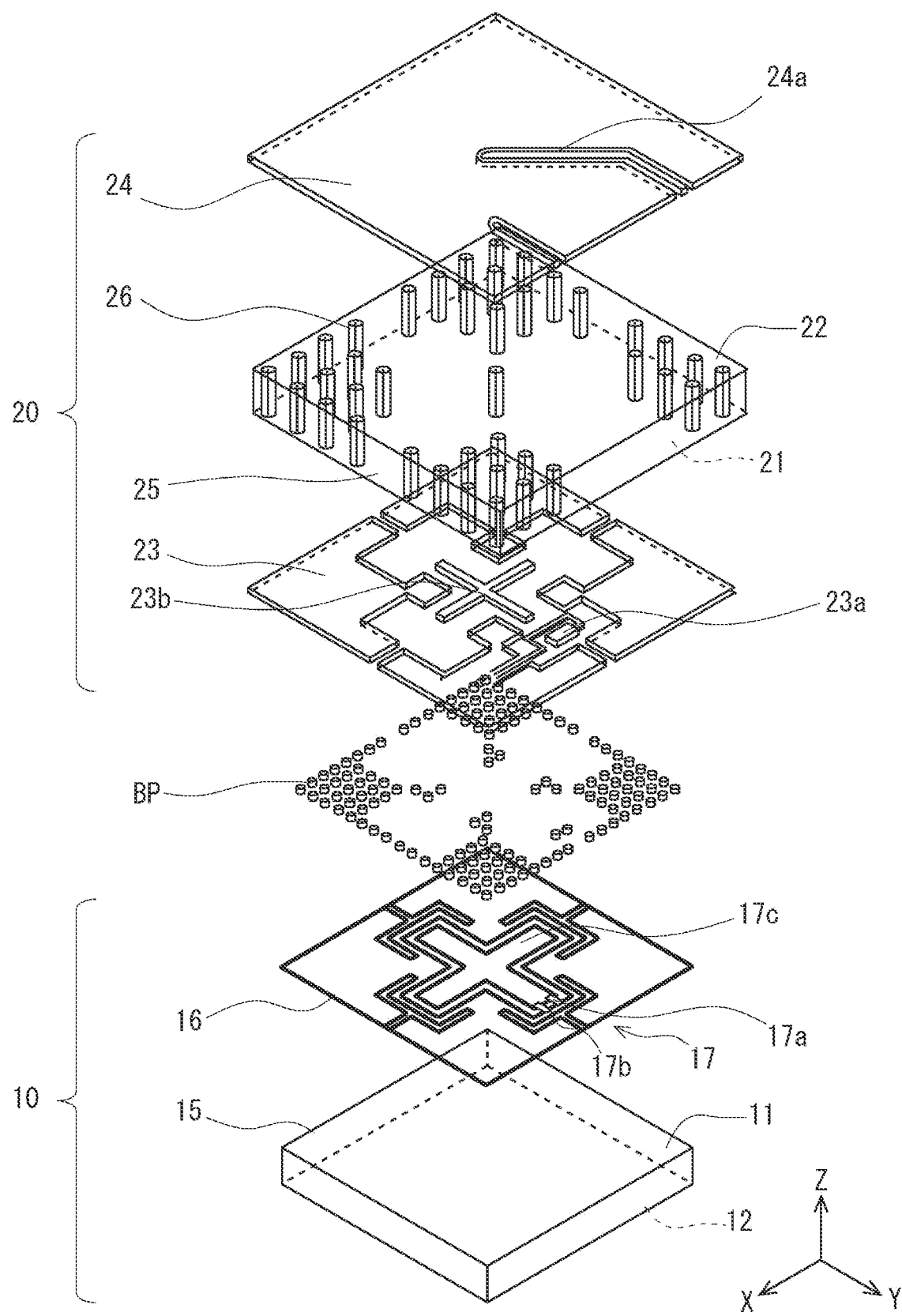
FIG. 4 is an exploded perspective view showing an example of a quantum element according to the first example embodiment.

FIG. 3 is a cross-sectional view showing an example of the quantum element QE according to the first example embodiment. FIG. 4 is an exploded perspective view showing an example of the quantum element QE according to the first example embodiment. As shown in FIGS. 3 and 4, the quantum element QE includes a quantum chip 10 and an interposer 20.

The quantum chip 10 includes a chip substrate 15 and a wiring layer 16. The chip substrate 15 contains, for example, silicon (Si). Note that the chip substrate 15 is not limited to those containing silicon and may include those containing other electronic materials such as sapphire or a compound semiconductor material (Groups IV, III-V, and II-VI) as long as the quantum chip 10 can perform information processing under a quantum state. Further, the material is preferably a single-crystalline material, but it may be a polycrystalline material or an amorphous material.

The chip substrate 15 has, for example, a plate-like shape, and has one plate surface and the other plate surface opposite to the one plate surface. The one plate surface is called a first surface 11, and the other plate surface is called a second surface 12. Therefore, the quantum chip 10 and the chip substrate 15 have the first surface 11 and the second surface 12. For example, both the first surface 11 and the second surface 12 have a rectangular shape. In the quantum element QE, the first surface 11 faces the interposer 20 side. The quantum chip 10 is mounted on the interposer 20 so that the first surface 11 is opposed to the interposer 20 with bumps BP interposed therebetween.

The wiring layer 16 is disposed on the first surface 11 side of the chip substrate 15. The wiring layer 16 contains, for example, a superconductive material such as niobium (Nb). Note that the superconductive material used in the wiring layer 16 is not limited to niobium (Nb). For example, the superconductive material may contain niobium nitride, aluminum (Al), indium (In), lead (Pb), tin (Sn), rhenium (Re), palladium (Pd), titanium (Ti), tantalum (Ta), tantalum nitride, or an alloy containing at least one of them.

The wiring layer 16 includes a quantum circuit 17. A resonator 17c including a loop circuit 17b in which pieces of a superconductive material are connected to each other in a circular manner by Josephson junctions 17a is formed in the quantum circuit 17. The material used for the Josephson junctions is preferably aluminum (Al), but may be other superconductive materials. The quantum circuit 17 has a configuration that uses the resonator 17c in a superconducting state in which the quantum chip is in a quantum state. As described above, the quantum chip 10 includes the quantum circuit 17 and performs an operation under a quantum state.

The wiring layer 16 is mounted (e.g., formed) on the interposer 20 with the bumps BP interposed therebetween. Therefore, the quantum chip 10 is mounted on the interposer 20 by using a flip-chip mounting technique.

The bumps BP may contain the above-described superconductive material. The bumps BP may contain the same superconductive material as that contained in the wiring layer 16, and/or a superconductive material different from that contained in the wiring layer 16. Further, when the bump BP includes a plurality of metal layers, at least one of the layers preferably includes a superconductive material. The bump BP may have a layered structure including Nb (the wiring surface of the quantum chip 10)/In (Sn, Pb, or an alloy containing at least one of them)/Ti/Nb (the wiring surface of the interposer 20)/Cu, or a layered structure including Nb (the wiring surface of the quantum chip 10)/Nb (the wiring surface of the interposer 20)/Cu. Alternatively, the bump BP may have a layered structure including Nb (the wiring surface of the quantum chip 10)/In (Sn, Pb, or an alloy containing at least one of them)/Ta (the wiring surface of the interposer 20)/Cu. Further, in the case where the bump BP contains Al and In, TiN may be used for a barrier layer in order to prevent Al and In from forming an alloy thereof. In such a case, the bump BP may have a layered structure including Al (the wiring surface of the quantum chip 10)/Ti/TiN/In (Sn, Pb, or an alloy containing at least one of them)/TiN/Ti/Al (the wiring surface of the interposer 20)/Cu. Note that Ti is an adhesion layer. The flip-chip connection is preferably Nb (the wiring of the quantum chip 10)/In/Ti/Nb (the wiring surface of the interposer 20)/Cu, or Nb (the wiring of the quantum chip 10)/Nb (wiring surface of the interposer 20)/Cu. Copper (Cu) is preferably added to an interposer wiring layer 23 having a thickness of 2 μm in a range of thickness from 2 μm to 10 μm, and bumps each of which has a diameter of 100 μm are preferably provided.

The interposer 20 includes interposer wiring layers 23 and 24, an interposer substrate 25, and a through via material (hereafter referred to as TVs 26) (in this specification, the term "through via" also means a conductive material with which the through via is filled). Note that, in FIG. 3, illustration of the TVs 26 is omitted in order to prevent the drawing from becoming too complicated.

The interposer substrate 25 is, for example, a plate-like substrate. The interposer substrate 25 contains, for example, silicon (Si). Note that the interposer substrate 25 is not limited to those containing silicon and may include those containing other electronic materials such as sapphire, a compound semiconductor material (Groups IV, III-V, and II-VI), glass, or ceramics as long as the quantum chip 10 can mounted thereon. The surface of the interposer substrate 25 is preferably covered by a silicon oxide film (such as a $SiO_2$ film or a TEOS film). The interposer substrate 25 and the interposer 20 have a mounting surface 21 on which the quantum chip 10 is mounted, and an opposite surface 22 opposite to the mounting surface 21.

For example, the quantum chip 10 is disposed on the Z-axis negative direction side of the interposer 20. The wiring layer 16 disposed on the X-axis positive direction side of the quantum chip 10 and the mounting surface 21 disposed on the Z-axis negative direction side of the interposer 20 are connected to each other through the bumps BP.

The interposer wiring layer 23 is formed on the mounting surface 21 side of the interposer 20, i.e., on the Z-axis negative direction side of the interposer 20. The interposer wiring layer 23 includes the above-described superconductive material. The interposer wiring layer 23 may contain the same superconductive material as that contained in the wiring layer 16, and/or a superconductive material different from that contained in the wiring layer 16. For example, the interposer wiring layer 23 preferably contains, as viewed from the surface toward the interposer substrate 25, Nb (having a thickness of 0.1 μm), Cu (having a thickness of 2 μm), and Ti in this order. For example, in the case where the interposer substrate 25 contains silicon, the mounting surface 21 side of the interposer 20 preferably has a structure expressed as $Nb/Cu/Ti/SiO_2/Si$ (the interposer substrate 25). The interposer wiring layer 23 is connected to the wiring layer 16 of the quantum chip 10 with the bumps BP interposed therebetween.

The interposer wiring layer 23 may be a single layer or composed of a plurality of layers. The interposer wiring layer 23 may include a magnetic-field applying circuit 23a and a reading part 23b. The magnetic-field applying circuit 23a generates a magnetic field applied to the loop circuit 17b. It is possible to make the quantum circuit 17 function as a transmitter by applying a magnetic field to the loop circuit 17b. The reading part 23b reads information from the quantum circuit 17.

The interposer wiring layer 24 is formed on the opposite surface 22 side of the interposer substrate 25, i.e., on the Z-axis positive direction side of the interposer 20. The interposer wiring layer 24 may contain the above-mentioned superconductive material. The interposer wiring layer 24 may contain the same superconductive material as those contained in the wiring layer 16 and the interposer wiring layer 23, and/or a superconductive material different from those contained in the wiring layer 16 and the interposer wiring layer 23. Further, the interposer wiring layer 24 may contain a normal conductive material. The normal conductive material is, for example, copper (Cu), silver (Ag), gold (Au), platinum (Pt), or an alloy containing at least one of them. For example, the interposer wiring layer 24 preferably contains, as viewed from the surface toward the interposer substrate 25, Cu and Ti in this order. For example, in the case where the interposer substrate 25 contains silicon, the opposite surface 22 side of the interposer 20 preferably has a structure expressed as $Cu/Ti/SiO_2/Si$ (the interposer substrate 25).

The interposer wiring layer 24 may be a single layer or composed of a plurality of layers. The interposer wiring layer 24 includes a terminal 24a through which information is acquired from the quantum chip 10 through the TVs 26 (i.e., through the conductive materials with which the TVs 26 are filled). Although only one terminal 24a is shown in FIG. 2, a plurality of terminals 24a may be formed in the interposer wiring layer 24. In the quantum device 1 according to this example embodiment, it is possible to make full use of the opposite surface 22 for the terminal(s) 24a through which information is acquired. When the terminal surface QE1 of the quantum element QE is the opposite surface 22, the terminal of the quantum element QE is formed on the opposite surface 22.

The TVs 26 extends from the mounting surface 21 side of the interposer substrate 25 to the opposite surface 22 side thereof. The interposer wiring layers 23 and 24 are connected to each other through the TVs 26.

The TVs 26 (i.e., the conductive materials with which the TVs 26 are filled) may contain the superconductive material described above. The TVs 26 may contain the same superconductive material as that contained in the wiring layer 16 and the like, and/or a superconductive material different from that contained in the wiring layer 16 and the like. Further, the TVs 26 may contain the above-described normal conductive material. The TVs 26 may contain the same normal conductive material as that contained in the interposer wiring layer 24, and/or a normal conductive material different from that contained in the interposer wiring layer 24. For example, each of the TVs 26 may be formed by forming $SiO_2$ (e.g., a thermal oxide film) on the side wall of a through hole having a diameter of 50 μm and filling the through hole with Cu while using Ti as an adhesion layer.

<Socket>

Returning to FIGS. 1 and 2, the socket 40 is disposed so as to be opposed to the quantum element QE. For example, in this example embodiment, the socket 40 is disposed to be opposed to the terminal surface QE1 of the quantum element QE. Specifically, the socket 40 is disposed on the Z-axis positive direction side of the quantum element QE. When the quantum element QE includes the quantum chip 10 and the interposer 20, the terminal surface QE1 is the opposite surface 22 of the interposer 20. Therefore, in this case, the socket 40 is disposed to be opposed to the opposite surface 22 of the interposer 20. When the quantum element QE includes only the quantum chip 10, the terminal surface QE1 is the first surface 11 of the quantum chip 10. Therefore, in this case, the socket 40 is disposed to be opposed to the first surface 11 of the quantum chip 10. The socket 40 includes a housing 45 and contacts 47. Note that, in FIGS. 1 and 2, some reference numerals (or symbols) are omitted to prevent the drawing from being complicated.

The housing 45 includes one end surface 41 and the other end surface 42 opposite to the one end surface 41. Further, the housing 45 includes a side surface 43 that connects the peripheral edge of the one end surface 41 to the peripheral edge of the other end surface 42. For example, the one end surface 41 faces the quantum element QE side and faces downward, and the other end surface 42 faces upward. The housing 45 holds the contacts 47. The housing 45 may hold a plurality of contacts 47.

The housing 45 preferably includes a material having a linear expansion coefficient of 0.5 to $50 \times 10^{-6}$/K. The housing 45 preferably contains an insulating material. At least a part of the housing 45 that is in contact with the contacts 47 contains an insulating material. Further, the housing 45 preferably contains a non-magnetic material. Further, the housing 45 preferably contains a material having a linear expansion coefficient equivalent to that of the interposer 20.

The housing 45 may contain quartz or plastics such as engineering plastics. The housing 45 may contain a composite material that has a low linear thermal expansion coefficient, and contains aluminum oxide ($Al_2O_3$, also called alumina), mica-based machinable ceramic, aluminum nitride (AlN), zirconia ($ZrO_2$), MACOR-based machinable ceramic, glass, a resin, and a silica filler, or may contain a superconductive material as long as insulation from the contacts 47 can be ensured.

The contacts 47 are held in the housing 45. Each of the contacts 47 has one end and the other end located on a side opposite to the one end. Each of the contacts 47 extends in the Z-axis direction, and one end thereof faces downward and the other end thereof faces upward. Therefore, the one end of each of the contacts 47 may protrude from the one end face 41 of the housing 45. The one end of each of the contacts 47 is, for example, electrically connected to one of the terminals 29 of the terminal surface QE1. The other end of each of the contacts 47 may protrude from the other end face 42. The other end of each of the contacts 47 is electrically in contact with one of terminals of the board 50. As described above, the housing 45 may include the one end face 41 from which the one end of each of the contacts 47 protrudes, and the other end face 42 from which the other end of each of the contacts 47 protrudes. Although a space is formed between the one end face 41 of the housing 45 and the quantum element QE in FIG. 2, no space may be formed as long as the one end of each of the contacts 47 can be in contact with one of the terminals of the terminal surface QE1. Similarly, no space may be formed as long as the other end of each of the contacts 47 can be in contact with one of the terminals of the board 50.

The one ends and the other ends of the contacts 47 are connected to their corresponding components in a conducting state with elastic means, such as a coil spring and a leaf spring, interposed therebetween. Regarding the one end and the other end of each contact 47, at least the one end of the contact 47, which is in electrical contact with the terminal of the terminal surface QE1, may be movable relative to the housing 45. The other end of the contact 47 may also be movable relative to the housing 45. The other end of the contact 47 is in electrical contact with, for example, the terminal of the board 50 on which a connector that serves as an external input/output is formed.

The contacts 47 may contain a superconductive material and/or a normal conductive material. The contacts 47 may contain the same superconductive material as that contained in the wiring layer 16 and the like, and/or a superconductive material different from that contained in the wiring layer 16 and the like. Further, the contacts 47 may contain the same normal conductive material as that contained in the interposer wiring layer 24, and/or a normal conductive material different from that contained in the interposer wiring layer 24. The contacts 47 are preferably made of a non-magnetic material. The contacts 47 preferably contain, for example, a palladium alloy, a gold alloy, beryllium copper (BeCu), gold (i.e., plated with gold), niobium (Nb), niobium titanium (Nb—Ti), or titanium (Ti).

When a plurality of contacts 47 are provided, centers of gravity of the plurality of contacts 47 may be located, for example, at the center of the terminal surface QE1 of the quantum element QE in a direction orthogonal to the terminal surface QE. By doing so, the displacement between the contacts 47 and the respective terminals of the quantum element QE can be made uniform.

The socket 40 may include a positioning pin (not shown). The positioning pin is a pin for determining the position of the socket 40. The positioning pin is held by the housing 45. The positioning pin includes, for example, one end protruding from the one end surface 41. The one end of the positioning pin is brought into contact with a predetermined place on the terminal surface QE1, so that the position of the socket 40 is determined. Note that a hole may be formed in the terminal surface QE1 of the interposer 20 and the positioning pin 48 may be inserted into the hole, so that the position of the socket 40 is determined. In this way, it is possible to prevent the socket 40 from being displaced. Here, the hole may or may not be penetrated. The through hole indicates a penetrating hole.

The housing 45 may have fixing parts 45A and a body part 45B other than the fixing part 45A. The body part 45B has one end surface 41 and the other end surface 42 like the housing 45. Each of the fixing parts 45A has a protruding shape protruding from the other end surface 42 of the body part 45B. The fixing parts 45A and the body part 45B will be described later.

<Board>

The board 50 is disposed so as to be opposed to the other end surface 42 of the socket 40. Specifically, the board 50 is disposed on the Z-axis positive direction side of the socket 40. The board 50 includes a board substrate 55, bolts 56, and connectors and terminals (not shown). The board substrate 55 is, for example, a plate-like substrate, and has an upper surface 52 and a lower surface 51. The lower surface 51 of the board substrate 55 faces the socket 40. The terminal is disposed on the lower surface 51 of the board substrate 55. The connector (not shown), which serves as an external input/output, is formed on the upper surface 52 of the board substrate 55. The board substrate 55 may include epoxy, acrylic, urethane, polyimide, phenol, liquid crystal polymer, and the like as materials, and may also include a filler selected from silica, an organic resin, and a ceramic, or a glass fiber as such materials. The board substrate 55 may contain a solidified ceramic powder. The connector of the board 50 is connected to the terminal of the board 50. The other ends of the movable pins 47 are in electrical contact with the terminal of the board 50.

The board 50, on which the connector serving as the external input/output is formed, receives/outputs electric power, signals, and the like from/to the quantum element QE through the socket 40. The bolts 56 are fastened to holes formed in the housing 45 through holes penetrating the board substrate 55 to fix the board substrate 55 to the housing 45.

The board substrate 55 may have holes 55C different from the holes into which the bolts 56 are inserted. Each of the holes 55C may be a through hole penetrating the board substrate 55. The holes 55C will be described later.

<Fixing Parts and Body Part of Housing, and Hole of Board Substrate>

Next, the fixing parts 45A and the body part 45B of the housing 45 and the holes 55C of the board substrate 55 will be described. Either one of the housing 45 and the board substrate 55 has a hole. For example, the board substrate 55 has the holes 55C. Each of the holes 55C may be a through hole penetrating the board substrate 55. The other one of the housing 45 and the board substrate 55 includes a fixing part arranged inside the hole and a body part other than the fixing part. For example, the housing 45 has the fixing parts 45A and the body part 45B other than the fixing parts 45A, which are arranged inside the hole 55C of the board substrate 55. Each of the fixing parts 45A has a protruding shape protruding from the body part 45B. The fixing parts 45A and the body part 45B are integrally formed.

When the fixing parts 45A and the body part 45B are integrally formed, it means that the fixing parts 45A and the body part 45B are made of one member, and the fixing parts 45A and the body part 45B are integrated. That is, the fixing parts 45A and the body part 45B are, for example, formed by being cut, integrally formed by means of a 3D printer, or cast in a cavity of a mold, and there is no joint between the fixing parts 45A and the body part 45B. Therefore, the integral forming does not include the case where the fixing parts 45A are bonded to the body part 45B with an adhesive.

When a plurality of the fixing parts 45A and the holes 55C are provided, the centers of gravity of the plurality of fixing parts 45A and the centers of gravity of the plurality of contacts 47 are within a predetermined range when viewed from a direction orthogonal to the terminal surface QE. Here, the predetermined range includes a position where the centers of gravity of the plurality of fixing parts 45A matches the centers of gravity of the plurality of contacts 47, and is a range in which the contacts 47 can follow the deformation of the housing 45 and the board substrate 55. It is preferable that the centers of gravity of the plurality of fixing parts 45A match the centers of gravity of the plurality of contacts 47. In this way, the displacement between the quantum element QE, the socket 40, and the board 50 can be made uniform.

Each of the fixing parts 45A preferably has a cylindrical shape with a central axis in the Z-axis direction. Accordingly, each of the holes 55C preferably has a cylindrical shape with a central axis in the Z-axis direction. In this way, forming by a drill or the like can be facilitated. Further, the volume change during thermal expansion can be made uniform in the XY-plane. In addition, the fixing part may have a taper whose diameter expands toward the body part 45B. Specifically, the fixing part 45A may have a taper whose diameter becomes smaller toward the Z-axis positive direction. The fixing part 45A is not limited to a cylindrical shape, and instead may be a prismatic shape or a columnar shape having an elliptical bottom surface. Accordingly, the hole 55C is not limited to a cylindrical shape and instead may be a square cylindrical shape or a cylindrical shape including an elliptical bottom surface.

Figure 5:
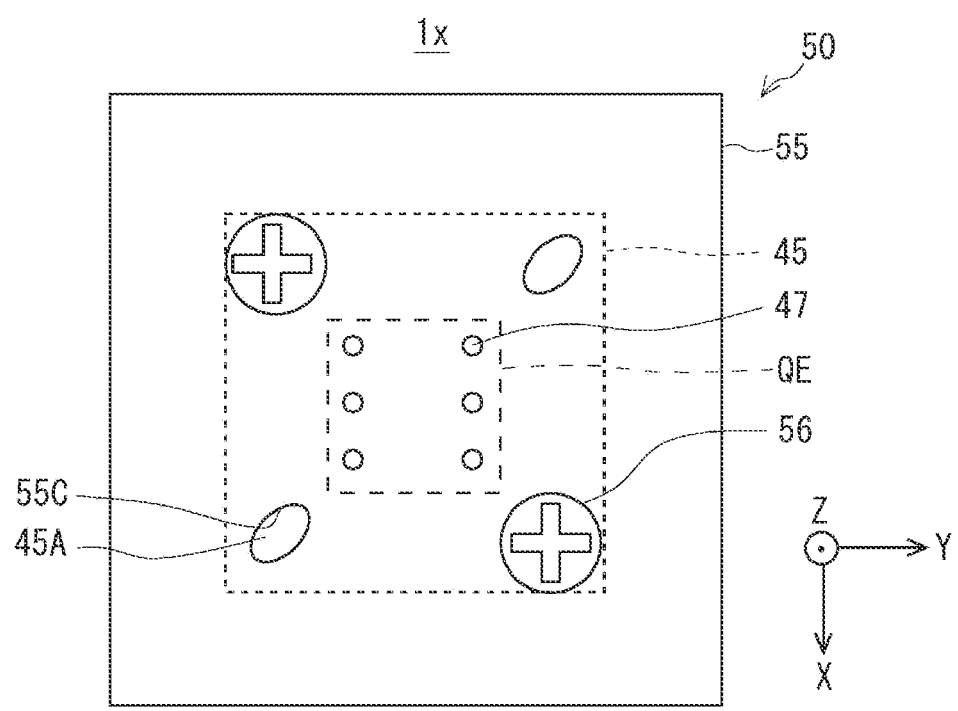
FIG. 5 is a plan view showing an example of a fixing part according to another example of the first example embodiment.
Figure 6:
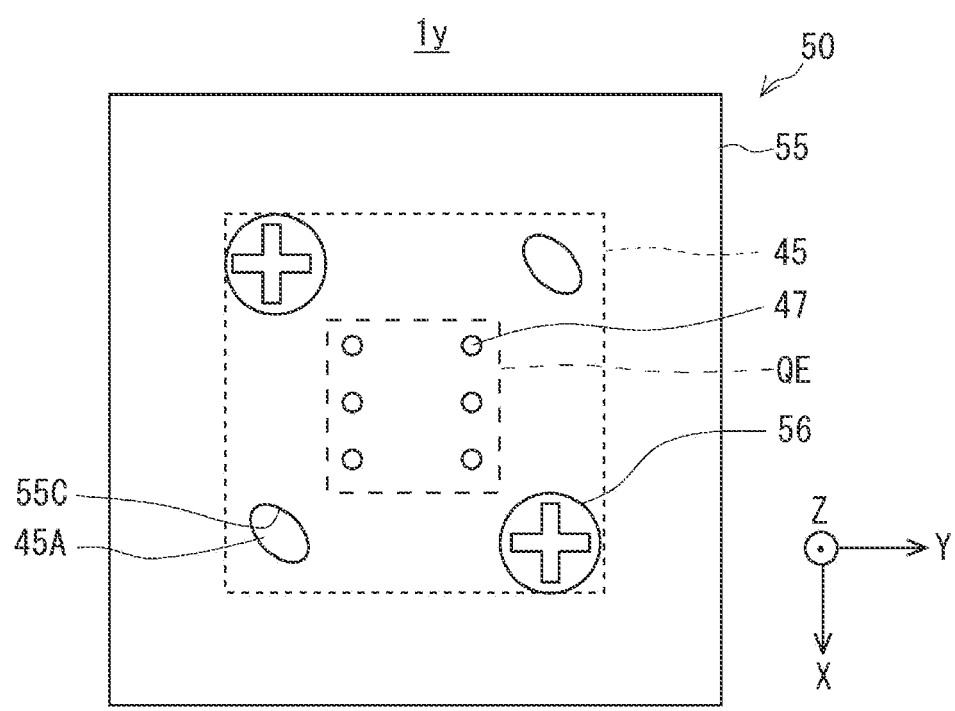
FIG. 6 is a plan view showing an example of the fixing part according to another example of the first example embodiment.

FIGS. 5 and 6 are plan views showing an example of the fixing parts 45A according to another example of the first example embodiment. As shown in FIGS. 5 and 6, each of the fixing parts 45A may have a shape having a longitudinal direction when viewed from the Z-axis direction orthogonal to the terminal surface QE1. For example, the fixing part 45A may have an elliptical shape with the longitudinal direction as a major axis and the shorter direction as a minor axis. As shown in FIG. 5, in a quantum device 1x, the longitudinal direction of the plurality of fixing parts 45A may pass through the centers of gravity of the plurality of fixing parts 45A and the plurality of contacts 47. Alternatively, as shown in FIG. 6, in a quantum device 1y, the shorter direction orthogonal to the longitudinal direction of the plurality of fixing parts 45A may pass through the centers of gravity of the plurality of fixing parts 45A and the plurality of contacts 47. The shape of the fixing part 45A shown in FIG. 5 or 6 is formed according to the relative change in the degree of expansion and contraction of each member. By doing so, the displacement of the members can be prevented or reduced. In addition, the shapes of the plurality of contacts 47 are not particularly limited, and the plurality of fixing parts 45A may be disposed at positions opposed to each other across the centers of gravity of the plurality of contacts 47. The direction in which one pair of fixing parts 45A disposed at the opposing positions are opposed to each other may be orthogonal to a direction in which another pair of fixing parts 45A are opposed to each other. Specifically, for example, when the four fixing parts 45A are disposed at corners of the rectangular body parts 45B as viewed from the Z-axis direction, the direction in which the one pair of fixing parts 45A is opposed to each other is orthogonal to the direction in which the other pair of fixing parts 45A is opposed to each other. With such an arrangement, the displacement of the members can be prevented or reduced.

<Cooling Base>

The cooling base 30 has a cooling function. For example, the cooling base 30 is a cold stage that can be cooled to an extreme temperature of about 10 [mK] by a refrigerator. For example, the cooling base 30 preferably contains a metal(s) such as Cu, a Cu alloy, Al, and the like. In the case where the cooling base 30 contains Al, it may be electrically insulated through an anodizing process. For example, the quantum device 1 according to this example embodiment uses, when Nb is contained as a superconductive material for the quantum element QE, a superconducting phenomenon at an extremely low temperature of 9.2 [K] or lower, and uses, when Al is contained, a superconducting phenomenon at an extremely low temperature of 1.2 [K] or lower. Therefore, the cooling base 30 that can be cooled to such an extreme temperature is used.

A part of at least one of the quantum element QE, the housing 45, and the board substrate 55 is in contact with the cooling base 30 having a cooling function. In FIG. 2, the lower surface of the quantum element QE is in contact with the cooling base 30.

Comparison Example

Figure 7:
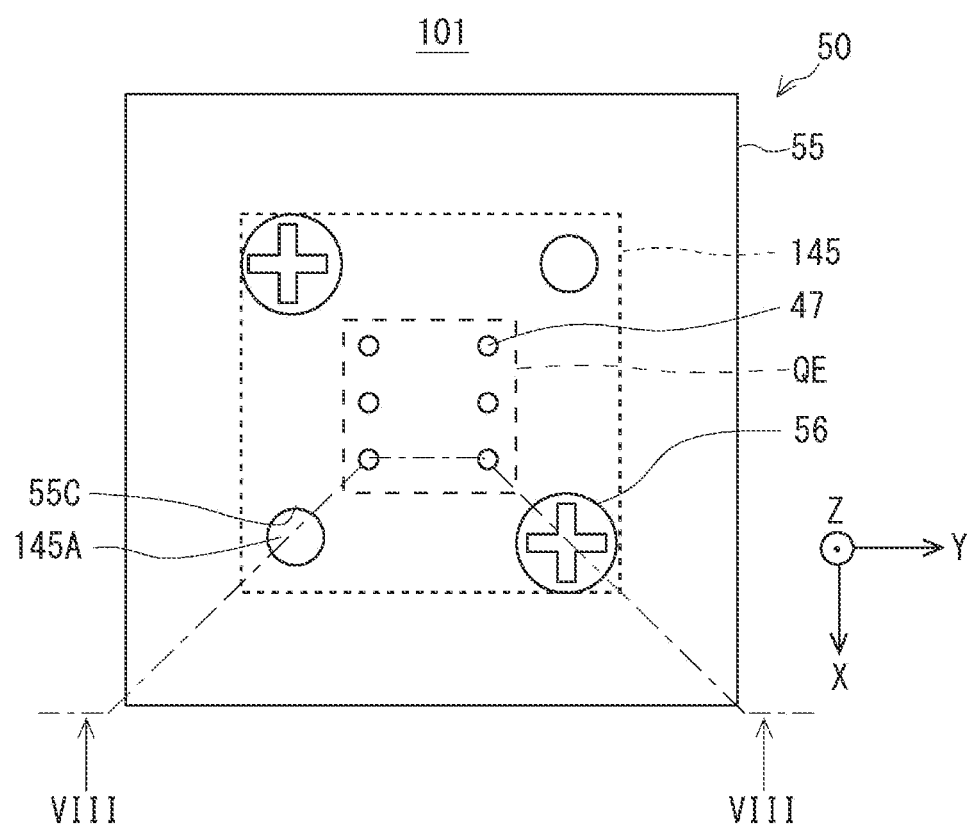
FIG. 7 is a plan view showing an example of a quantum device according to a comparative example.
Figure 8:
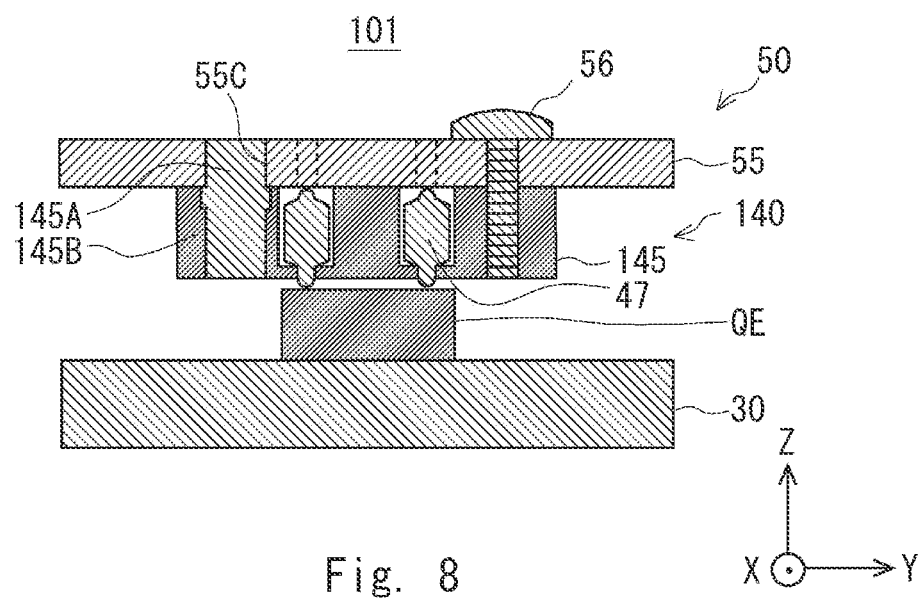
FIG. 8 is a cross-sectional view showing an example of the quantum device according to the comparative example, showing a cross section taken along the line VIII-VIII of FIG. 7.

Next, a comparison example will be described. FIG. 7 is a plan view showing an example of a quantum device according to the comparative example. FIG. 8 is a cross-sectional view showing an example of the quantum device according to the comparative example, showing a cross section taken along the line VIII-VIII of FIG. 7. As shown in FIGS. 7 and 8, a quantum device 101 according to the comparative example includes a quantum element QE, a socket 140, and a board 50. In the quantum device 101 according to the comparative example, the socket 140 has a housing 145 and contacts 47. The housing 145 includes fixing parts 145A and body parts 145B.

In the comparative example, the board substrate 55 has holes 55C. Each of the fixing parts 145A of the housing 145 has a part disposed inside the hole 55C of the board substrate 55. However, in the comparative example, unlike the first example embodiment, the fixing parts 145A and the body parts 145B are not integrally formed. For example, the fixing parts 145A and the body parts 145B are formed of materials different from each other. Therefore, in the comparative example, it is not possible to prevent or reduce an error due to a difference between the linear expansion coefficient of the fixing parts 145A and that of the body parts 145B. Thus, in the cooling process of the quantum device 101, a gap is generated when the housing 145 is contracted, and the displacement of the contacts 47 cannot be reduced.

Figure 9:
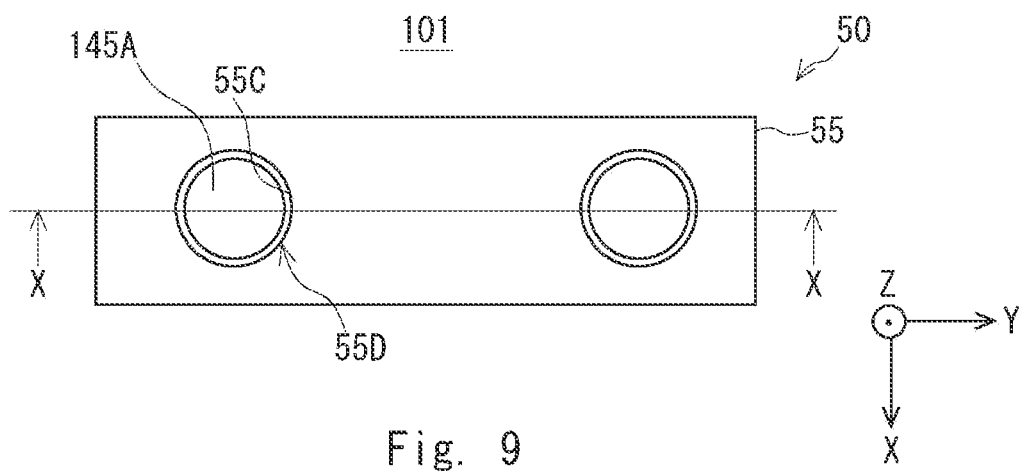
FIG. 9 is a plan view showing an overview of a state before fixing parts and body parts of a housing and a board substrate are cooled according to the comparative example.
Figure 10:
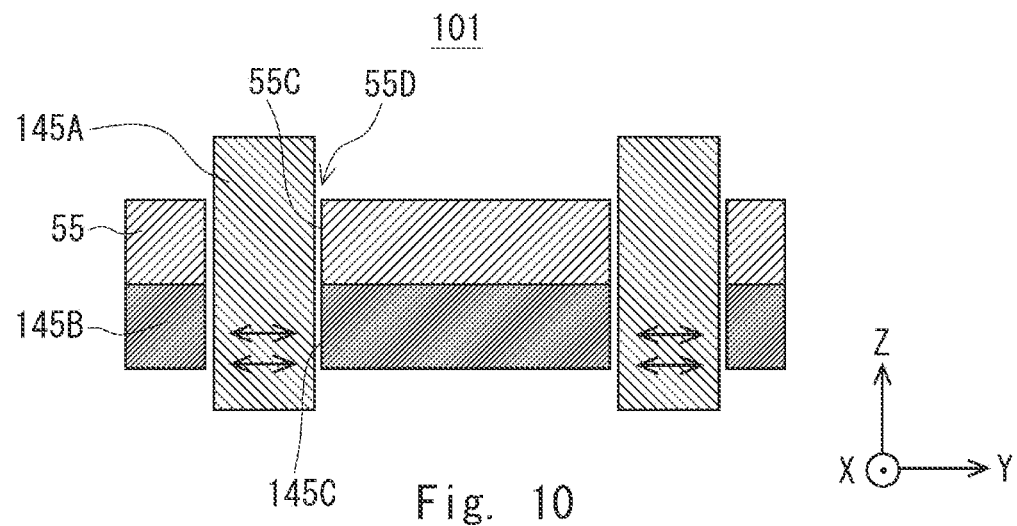
FIG. 10 is a cross-sectional view showing an overview of an example of a state before the fixing parts and the body parts of the housing, and the board substrate are cooled according to the comparative example, showing a cross section taken along the line X-X of FIG. 9.
Figure 11:
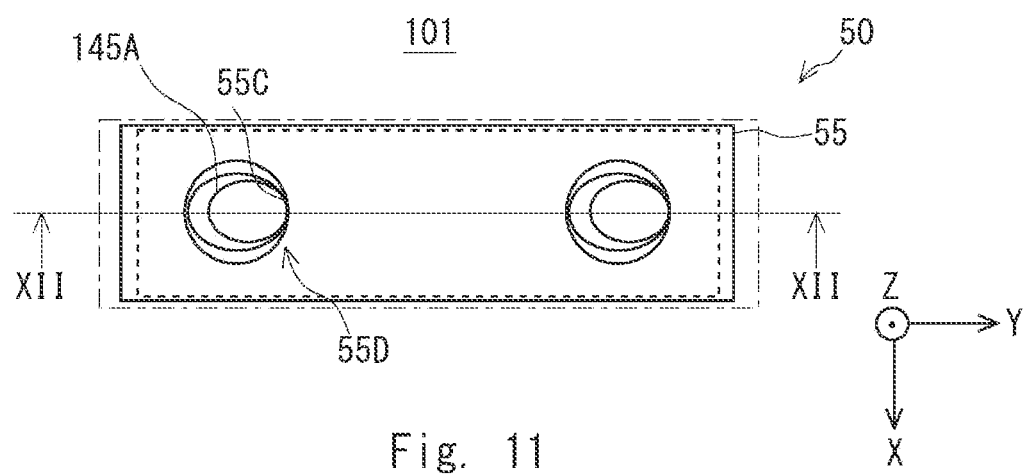
FIG. 11 is a plan view showing an overview of a state after fixing parts and body parts of a housing and a board substrate are cooled according to the comparative example.
Figure 12:
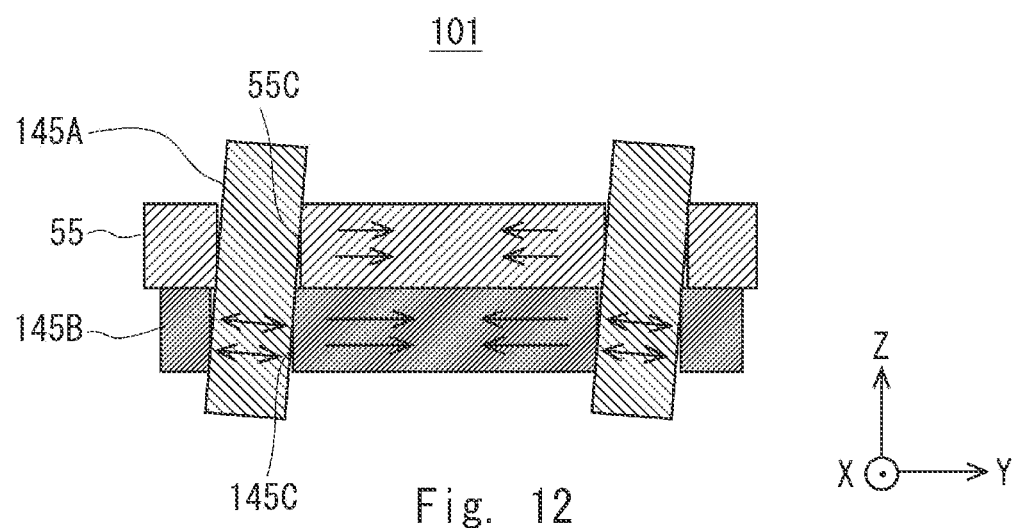
FIG. 12 is a cross-sectional view showing an overview of an example of a state after the fixing parts and the body parts of the housing, and the board substrate are cooled according to the comparative example, showing a cross section taken along the line XII-XII of FIG. 11.
Figure 13:
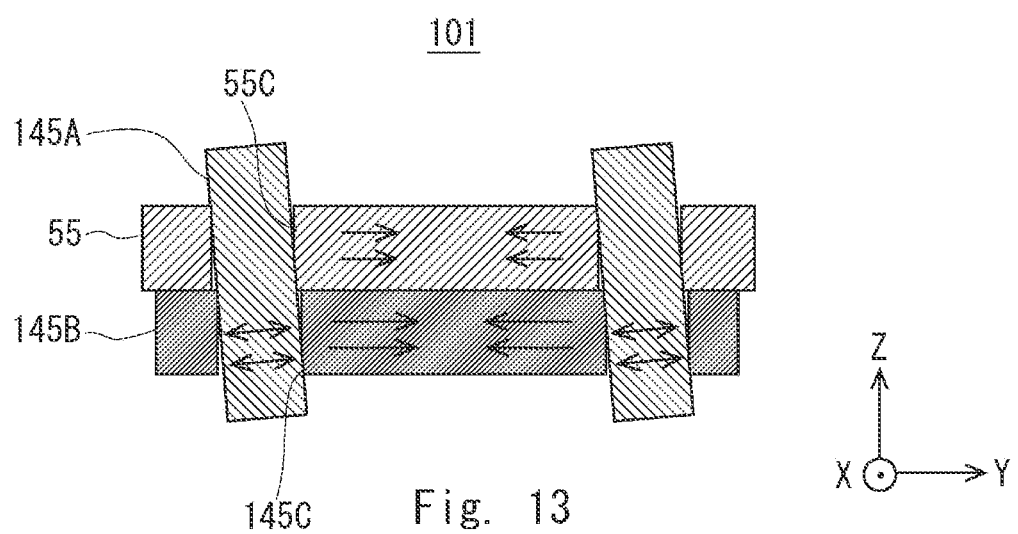
FIG. 13 is a cross-sectional view showing an overview of an example of a state after the fixing parts and the body parts of the housing, and the board substrate are cooled according to the comparative example, showing a cross section taken along the line XII-XII of FIG. 11.
Figure 14:
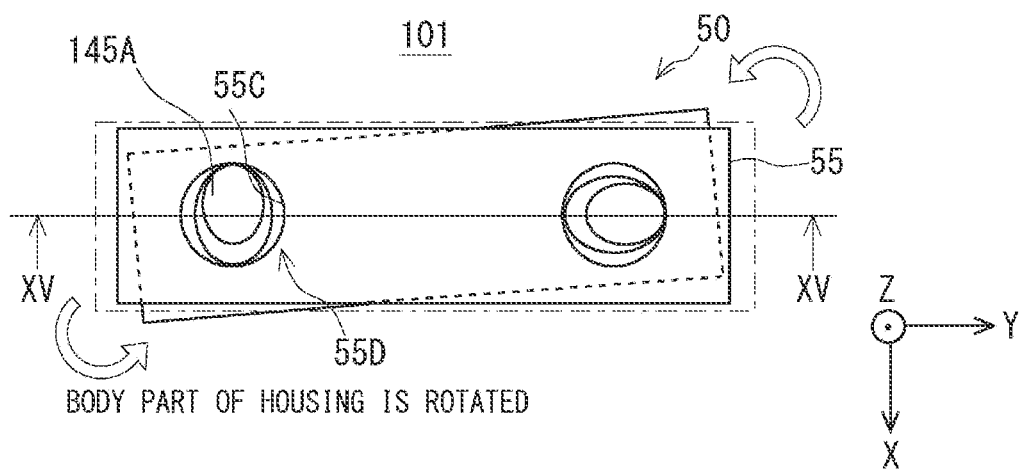
FIG. 14 is a plan view showing an overview of a state after fixing parts and body parts of a housing and a board substrate are cooled according to the comparative example.
Figure 15:
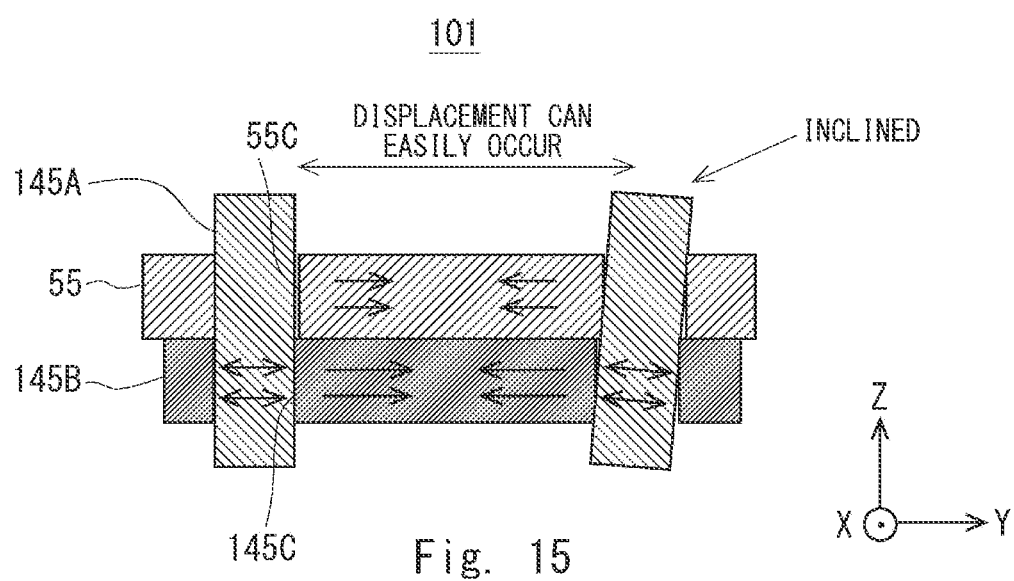
FIG. 15 is a cross-sectional view showing an overview of an example of a state after the fixing parts and the body part of the housing, and the board substrate are cooled according to the comparative example, showing a cross section taken along the line XV-XV of FIG. 14.

FIG. 9 is a plan view showing an overview of an example of a state before the fixing parts 145A and the body parts 145B of the housing 145 and the board substrate 55 are cooled according to the comparative example. FIG. 10 is a cross-sectional view showing an overview of an example of a state before the fixing parts 145A and the body parts 145B of the housing 145, and the board substrate 55 are cooled according to the comparative example, showing a cross section taken along the line X-X of FIG. 9. FIG. 11 is a plan view showing an overview of an example of a state after the fixing parts 145A and the body parts 145B of the housing 145 and the board substrate 55 are cooled according to the comparative example. FIGS. 12 and 13 are cross-sectional views showing an overview of an example of a state after the fixing parts 145A and the body parts 145B of the housing 145 and the board substrate 55 are cooled according to the comparative example, showing a cross section taken along the line XII-XII of FIG. 11. FIG. 14 is a plan view showing an overview of an example of a state after the fixing parts and the body parts of the housing and the board substrate are cooled according to the comparative example. FIG. 15 is a cross-sectional view showing an overview of an example of a state after the fixing parts and the body parts of the housing and the board substrate are cooled according to the comparative example, showing a cross section taken along the line XV-XV of FIG. 14.

As shown in FIGS. 9 and 10, before the cooling, the through holes including the holes 55C in the board substrate 55 and the holes 145C in the body parts 145B are formed in the quantum device 101. The fixing parts 145A are disposed inside the through holes, respectively. During the cooling, each member is contracted, so that the inner diameters of the through holes become small. Also, the center positions of the through holes may be displaced. Therefore, at a room temperature before the cooling, gaps 55D are formed between the fixing parts 145A and the through holes. For example, the degree of contraction of the material of each member during the cooling is (the body part 145B of the housing 145)>(the fixing parts 145A of the housing 145)> (the board substrate 55).

As shown in FIGS. 11 to 15, after the cooling, the central axes of the through holes may be displaced from each other, for example, due to a difference between the degree of contraction of the body parts 145B and the degree of contraction of the board substrate 55. As a result, the fixing parts 145A may be inclined from the state before the cooling. Therefore, the positions of the fixing parts 145A are displaced. Further, since the contraction of each member during the cooling is different from each other, the inclination of each fixing part 145A varies, and the center position of the socket 40 may also be displaced. For example, the fixing parts 145A are inclined in the Y-axis positive direction in FIG. 12, the fixing parts 145A are inclined in the Y-axis negative direction in FIG. 13, and the fixing parts 145A are inclined in the X-axis negative direction in FIGS. 14 and 15. The body parts 145B of the housing 145 are rotated counterclockwise with respect to the board substrate 55 in accordance with the movable range of the fixing parts 145A and the holes 55C (through holes). As described above, in the comparative example, displacement occurs when the fixing parts 145A are inclined or the body parts 145B are rotated due to the displacement of the central axes of the through holes from each other. Depending on the direction of the displacement of the central axes of the through holes, the inclination of the fixing parts 145A can be toward the X-axis direction, the Y-axis direction, a direction obtained by combining an X-axis direction component, and a Y-axis direction component, or the like.

Figure 16:
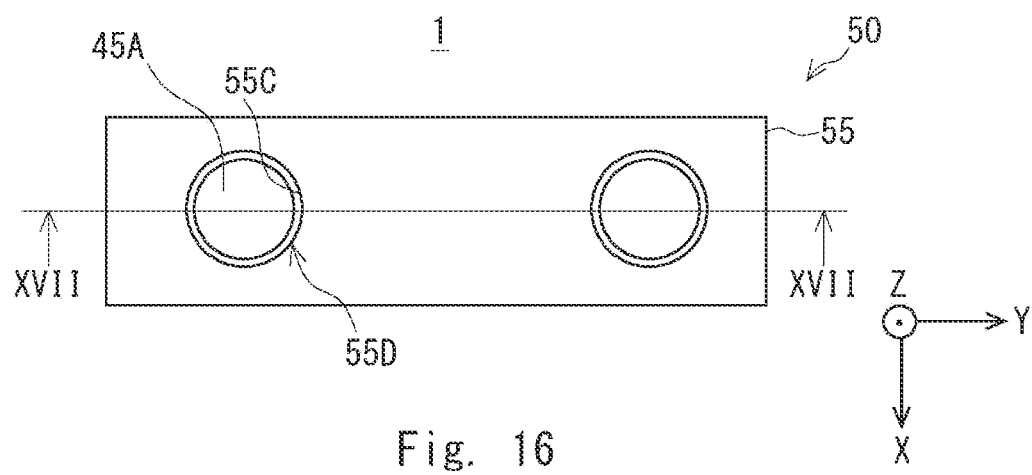
FIG. 16 is a plan view showing an overview of a state before fixing parts and body parts of a housing and a board substrate are cooled according to the first example embodiment.

FIG. 16 is a plan view showing an overview of an example of a state before the fixing parts 45A and the body parts 45B of the housing 45 and the board substrate 55 are cooled according to the first example embodiment.

Figure 17:
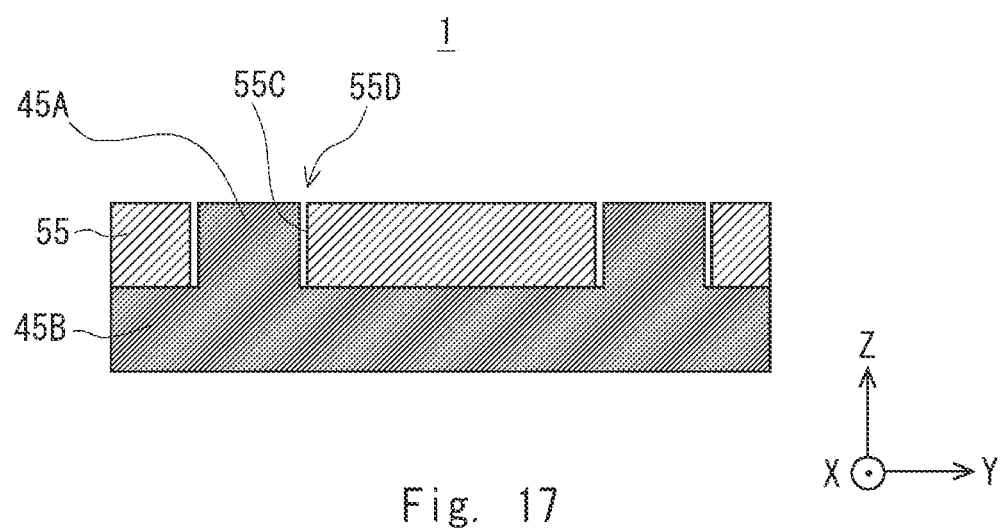
FIG. 17 is a cross-sectional view showing an overview of an example of a state before the fixing parts and the body parts of the housing, and the board substrate are cooled according to the first example embodiment, showing a cross section taken along the line XVII-XVII of FIG. 16.
Figure 18:
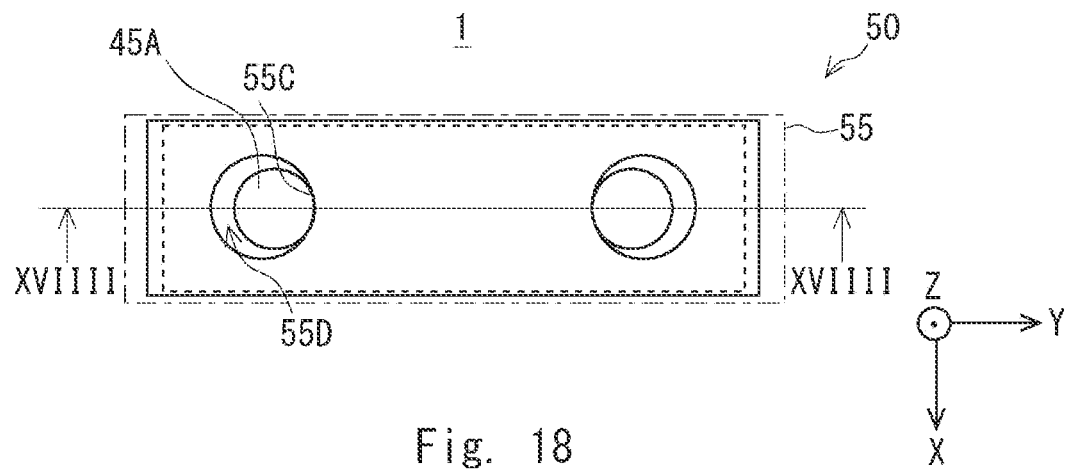
FIG. 18 is a plan view showing an overview of a state before fixing parts and body parts of a housing and a board substrate are cooled according to the first example embodiment.
Figure 19:
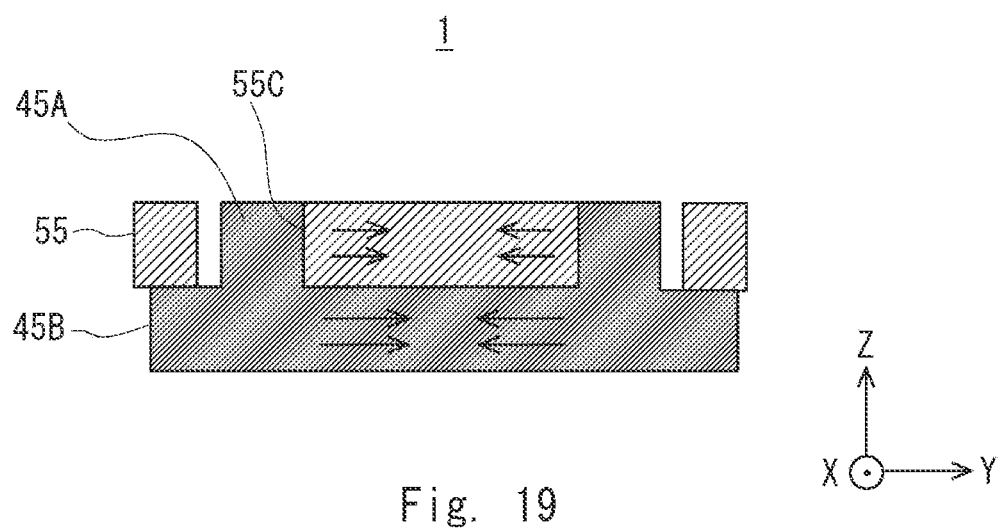
FIG. 19 is a cross-sectional view showing an overview of an example of a state before the fixing parts and the body parts of the housing, and the board substrate are cooled according to the first example embodiment, showing a cross section taken along the line XVIIII-XVIIII of FIG. 18.

FIG. 17 is a cross-sectional view showing an overview of an example of a state before the fixing parts 45A and the body parts 45B of the housing 45 and the board substrate 55 are cooled according to the first example embodiment, showing a cross section taken along the line XVII-XVII of FIG. 16. FIG. 18 is a plan view showing an overview of an example of a state after the fixing parts 45A and the body parts 45B of the housing 45 and the board substrate 55 are cooled according to the first example embodiment. FIG. 19 is a cross-sectional view showing an overview of an example of a state after the fixing parts 45A and the body parts 45B of the housing 45 and the board substrate 55 are cooled according to the first example embodiment, showing a cross section taken along the line XVIIII-XVIIII of FIG. 18.

As shown in FIGS. 16 and 17, before the cooling, the through holes are formed in the board substrate 55 as the holes 55C. The fixing parts 45A are disposed inside the holes 55C, respectively. During the cooling, each member is contracted, so that the inner diameters of the holes 55C become small. Therefore, at a room temperature before the cooling, gaps 55D are formed between the fixing parts 45A and the holes 55C. In the first example embodiment, for example, the degree of contraction of the material of each member during the cooling is (the fixing parts 45A and the body parts 45B of the housing 45)>(the board substrate 55).

As shown in FIGS. 18 and 19, after the cooling, in the first example embodiment, since the fixing parts 45A and the body parts 45B are integrally formed, the entire housing 45 is uniformly contracted. It is thus possible to prevent or reduce the displacement of the center position of the housing 45. Further, even when a difference between the contraction of the member and that of another member occurs, the movement of the fixing parts 45A is restricted by the inner walls of the holes 55C of the board substrate 55. This prevents the displacement of the fixing parts 45A.

Next, the effect of this example embodiment will be described. The housing 45 according to this example embodiment has the fixing parts 45A for fixing the board 50. The fixing parts 45A and the body parts 45B are integrally formed. Thus, an error due to a difference between the linear expansion coefficient of the fixing parts 45A and that of the body parts 45B can be suppressed. It is thus possible to reduce the displacement of the contacts 47 when the housing 45 is contracted as compared with the case where the board 50 is fixed only by using the bolts 56.

The centers of gravity of the plurality of fixing parts 45A and the centers of gravity of the plurality of contacts 47 are within a predetermined range when viewed from a direction orthogonal to the terminal surface QE1. Thus, the displacement of the quantum element QE with respect to the socket 40 can be made uniform.

In the first example embodiment described above, the board substrate 55 has the holes 55C and the housing 45 has the fixing parts 45A and the body parts 45B, but the present disclosure is not limited thereto.

Figure 20:
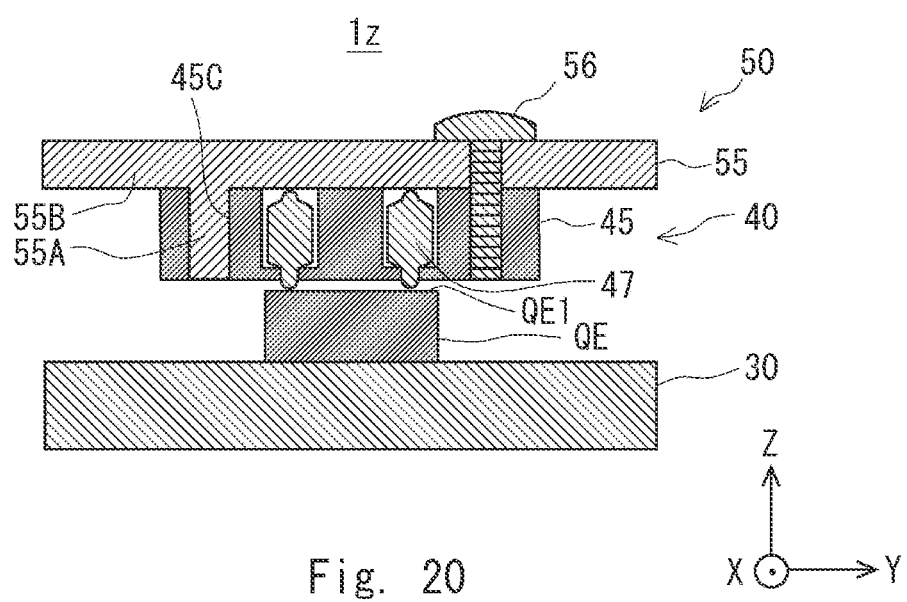
FIG. 20 is a cross-sectional view showing an example of a quantum device according to another example of the first example embodiment.

FIG. 20 is a cross-sectional view showing an example of a quantum device according to another example of the first example embodiment. As shown in FIG. 20, in a quantum device 1z, a housing 45 may have holes 45C, and a board substrate 55 may have fixing part 55A and a body part 55B. The fixing parts 55A and the body part 55B may be integrally formed. Also with such a configuration, the board substrate 55 has the fixing parts 55A for fixing the housing 45, and an error due to a difference between the linear expansion coefficient of the fixing parts 55A and that of the body parts 55B can be suppressed. It is thus possible to reduce the displacement of the contacts 47 when the housing 45 and the board substrate 55 are contracted.

First Modified Example

Next, a quantum device according to a first modified example of the first example embodiment will be described. In a quantum device according to this modified example, fixing parts 45A of a housing 45 are disposed in holes 55C of a board substrate 55, and fixing parts of a cooling base 30 are arranged in the holes 55C of the board substrate 55. This prevents the socket 40, the board 50, and the cooling base 30 from being displaced.

Figure 21:
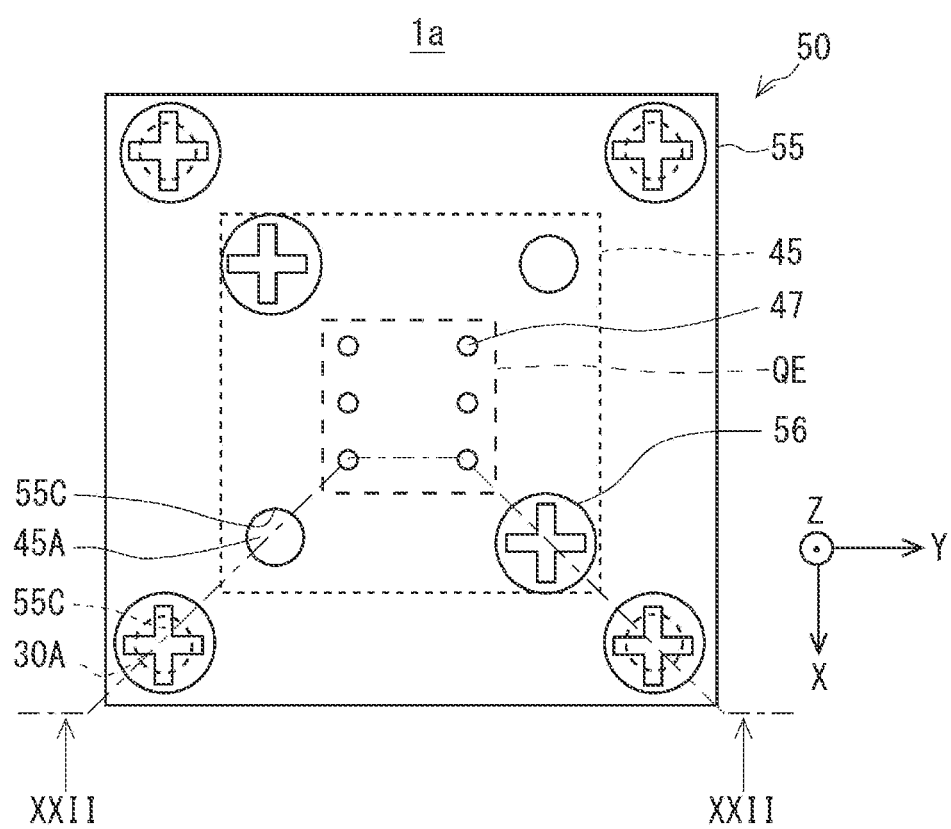
FIG. 21 is a plan view showing an example of a configuration of a quantum device according to a first modified example of the first example embodiment.
Figure 22:
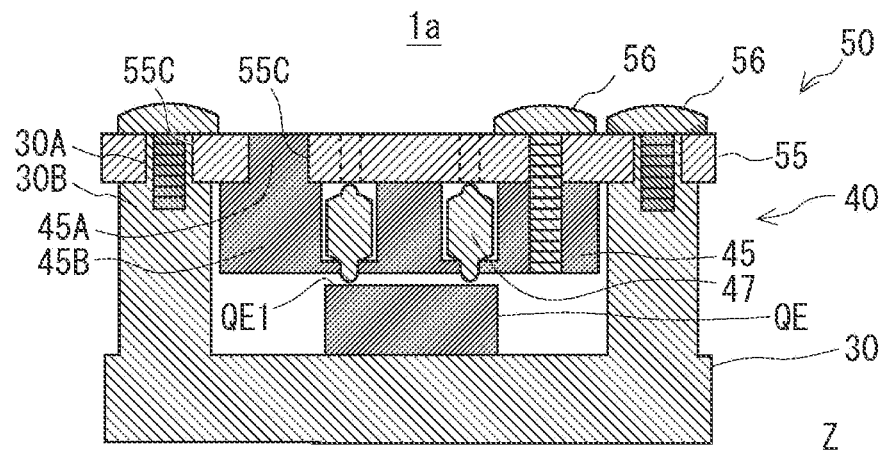
FIG. 22 is a cross-sectional view showing an example of a configuration of the quantum device according to the first modified example of the first example embodiment, showing a cross section taken along the line XXII-XXII of FIG. 21.

FIG. 21 is a plan view showing an example of a configuration of the quantum device according to the first modified example of the first example embodiment. FIG. 22 is a cross-sectional view showing an example of a configuration of the quantum device according to the first modified example of the first example embodiment, showing a cross section taken along the line XXII-XXII of FIG. 21. As shown in FIGS. 21 and 22, in the quantum device 1a according to this modified example, the cooling base 30 is in contact with the board substrate 55 in addition to the quantum element QE. Specifically, the lower sides and sides of the quantum element QE and the socket 40 are covered with the cooling base 30. That is, the quantum element QE and the socket 40 are disposed in a recessed part formed in the cooling base 30. The board substrate 55 is in contact with the edge of the cooling base 30.

The holes 55C are formed in parts of the board substrate 55 that are into contact with the cooling base 30. The cooling base 30 has fixing parts 30A disposed inside the holes 55C, respectively. Therefore, the cooling base 30 has the fixing parts 30A and a body part 30B other than the fixing part 30A. In the drawing, bolts 56 are inserted into the fixing parts 30A, but the bolts 56 may not necessarily be inserted into the fixing parts 30A.

According to this example embodiment, the cooling base 30 has the fixing parts 30A for fixing the board 50. The fixing parts 30A and the body part 30B are integrally formed. Thus, an error due to a difference between the linear expansion coefficient of the fixing parts 30A and that of the body parts 30B can be suppressed. It is thus possible to reduce the displacement of the contacts 47 as compared with the case where the contacts are fixed only by using the bolts 56.

A plurality of the fixing parts 30A may be provided. In this case, the centers of gravity of the plurality of fixing parts 30A and the centers of gravity of the plurality of contacts 47 are within a predetermined range when viewed from a direction orthogonal to the terminal surface QE1. This can prevent displacement of the quantum element QE with respect to each member such as the cooling base 30.

Note that in the first modified example described above, the board substrate 55 has the holes 55C, and the cooling base 30 has the fixing parts 30A and the body part 30B, but the present disclosure is not limited thereto. The cooling base 30 may have holes, and the board substrate 55 may have the fixing parts 55A and the body part 55B. In this manner, either one of the cooling base 30 and the board substrate 55 may have a hole, and the other of the cooling base 30 and the board substrate 55 may have a fixing part and a body part disposed inside the hole. The fixing part and the body part may be integrally formed. Also with such a configuration, the board substrate 55 has the fixing parts 55A for fixing the cooling base 30, and thus an error due to a difference between the linear expansion coefficient of the fixing parts 55A and that of the body part 55B can be suppressed. Therefore, the displacement of the contacts 47 when the cooling base 30 and the board substrate 55 are contracted can be reduced. Other configurations and effects are included in the description of the first example embodiment.

Second Modified Example

Next, a quantum device according to a second modified example of the first example embodiment will be described. The configuration of the cooling base 30 is different in this modified example.

Figure 23:
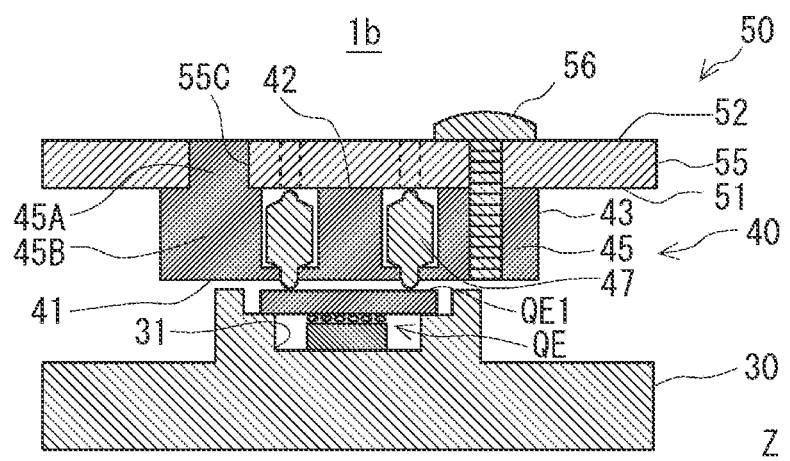
FIG. 23 is a cross-sectional view showing an example of a configuration of a quantum device according to a second modified example of the first example embodiment.
Figure 24:
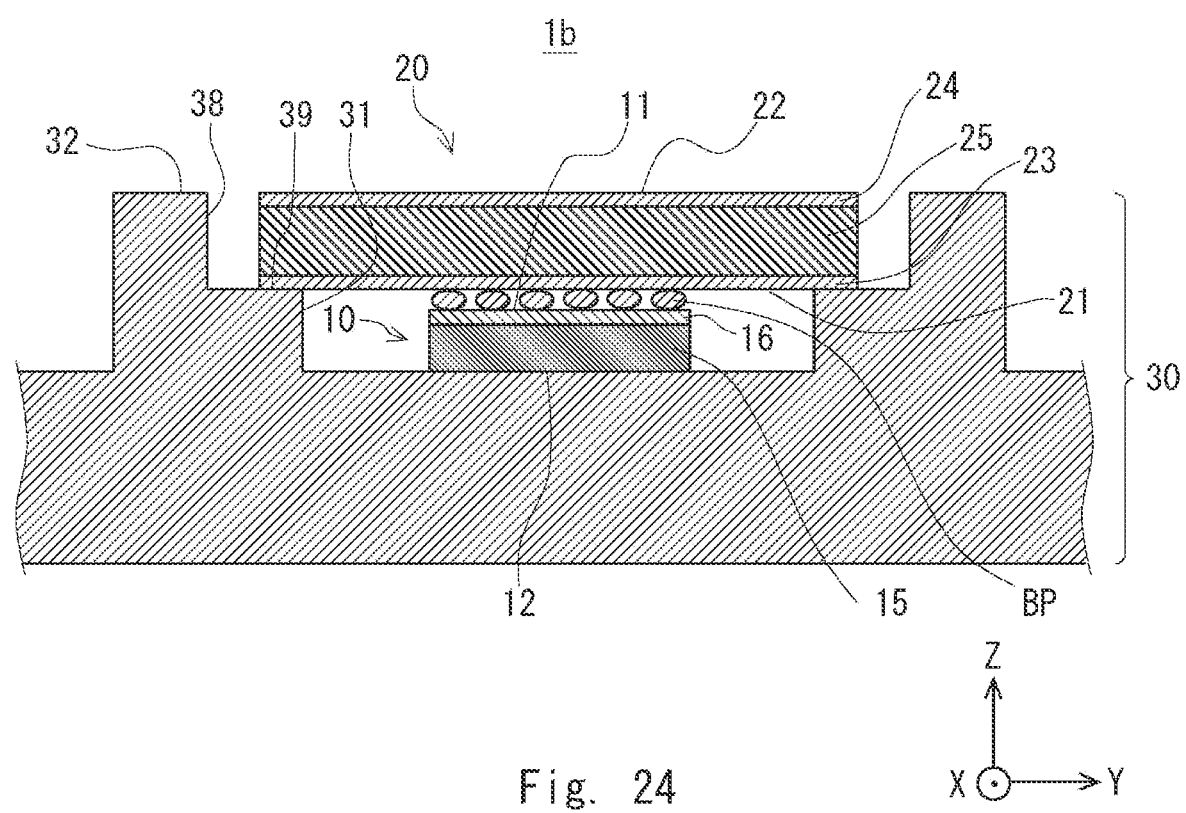
FIG. 24 is a cross-sectional view showing an example of a quantum element and a cooling base in the quantum device according to the second modified example of the first example embodiment.
Figure 25:
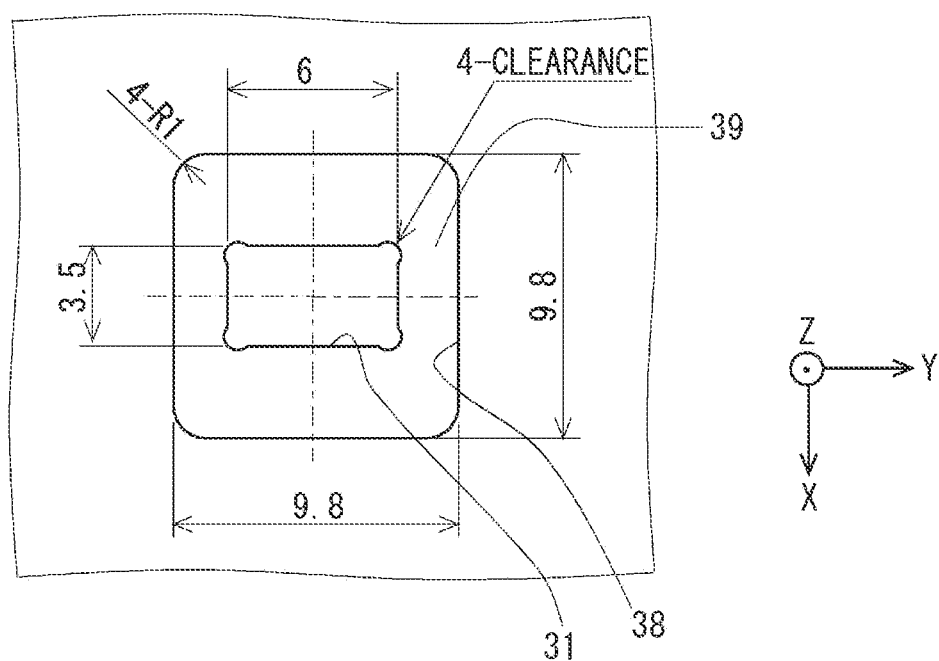
FIG. 25 is a plan view showing an example of a recessed part and a countersunk hole of the cooling base according to the second modified example of the first example embodiment.

FIG. 23 is a cross-sectional view showing an example of a configuration of the quantum device according to the second modified example of the first example embodiment. FIG. 24 is a cross-sectional view showing an example of a quantum element QE and a cooling base 30 in the quantum device according to the second modified example of the first example embodiment. FIG. 25 is a plan view showing an example of a recessed part 31 and a countersunk hole of the cooling base 30 according to the second modified example of the first example embodiment. As shown in FIGS. 23 to 25, in a quantum device 1b according to this modified example, the quantum element QE includes a quantum chip 10 and an interposer 20. A second surface 12 of the quantum chip 10 is in contact with the cooling base 30.

The recessed part 31 is formed in the cooling base 30. For example, the recessed part 31 is formed in a predetermined surface 32 of the cooling base 30. The predetermined surface 32 is, for example, an upper surface facing the Z-axis positive direction. The recessed part 31 is opened toward the Z-axis positive direction. As viewed from above, the recessed part 31 is, for example, rectangular. A countersunk hole 38 is formed around the opening of the recessed part 31. Thus, a stepped surface 39 having a predetermined surface 32 and a step (i.e., a difference in level) is formed around the opening of the recessed part 31. Accordingly, the countersunk hole 38 includes the stepped surface 39.

The stepped surface 39 is, for example, parallel to the predetermined surface 32. The stepped surface 39 is formed around the recessed part 31. The stepped surface 39 surrounds the recessed part 31. As viewed from above through the interposer 20 (e.g., as viewed above in a state where the interposer 20 is not disposed), the quantum chip 10 is smaller than the recessed part 31. Therefore, the quantum chip 10 is disposed inside the recessed part 31 formed in the cooling base 30 having a cooling function.

Meanwhile, the interposer 20 is larger than the recessed part 31 as viewed from above. Thus, a part of the interposer 20 is in contact with the cooling base 30. For example, a part of the mounting surface 21 of the interposer 20, on which the quantum chip 10 is mounted, is in contact with the stepped surface 39 of the cooling base 30.

An insulating film may be formed in the part of the interposer 20 that is in contact with the stepped surface 39 of the mounting surface 21 in order to prevent electrical conduction with the stepped surface 39. No interposer wiring layer 23 may be formed in the part of the mounting surface 21 of the interposer 20 that is in contact with the stepped surface 39 of the mounting surface 21.

By bringing at least a part of the interposer 20 into contact with the cooling base 30 and thereby using the interposer 20 as a heat flow path, it is possible to cool the quantum circuit 17 of the quantum chip 10 to an extremely low temperature and thereby to use a superconducting phenomenon. Further, it is possible to improve the cooling performance even further by bringing the second surface 12 of the quantum chip 10 into contact with the inner surface of the recessed part 31. In order to improve the thermal insulating property for reducing the change in the temperature (hereinafter also referred to as the temperature change) around the quantum chip, the area (e.g., space) surrounding the quantum chip 10 is preferably in a vacuum state or a reduced-pressure atmosphere state.

As shown in FIG. 25, a space is formed around the four sides of the recessed part 31 so that the quantum chip 10 can be placed therein. Further, the recessed part 31 may have such a shape that a circular part or an R-part is added to each of the four corners thereof. In this way, it is possible to prevent a stress and a strain from occurring due to the volume changes during the cooling to an extremely low temperature. In particular, it is possible to suppress the stress from being concentrated at the four corners which would otherwise be caused when the corners have right angles or acute angles.

In the quantum device 1b according to this modified example, the quantum chip 10 is disposed inside the cooling base 30 having the cooling function. Further, the second surface 12 of the quantum chip 10 is in contact with the inner surface of the recessed part 31 of the cooling base 30. Note that at least a part of the second surface 12 may be in contact the inner surface of the recessed part 31. By the above-described configuration, it is possible to cool the quantum chip 10 from the second surface 12 side thereof by thermal conduction to the cooling base 30, and thereby to improve the cooling performance. Therefore, it is possible to enable the quantum circuit 17 in the quantum chip 10 to operate in a stabilized manner.

Further, since the second surface 12 is in contact with the inner surface of the recessed part 31, it is possible to reduce the stress and the strain caused by the difference between the thermal contraction of the quantum chip 10 caused by the change of the temperature to an extremely low temperature and that of the cooling base 30.

Since at least a part of the interposer 20 is in contact with the cooling base 30, the quantum chip 10 can be cooled by the thermal conduction of the cooling base 30 through the first interposer 20, so that the cooling performance can be improved.

It is possible to make the best use of the opposite surface 22 of the interposer 20 in order to provide terminals 24a for obtaining (i.e., outputting) information from the quantum chip 10. Therefore, it is possible to increase the number of terminals for obtaining (i.e., outputting) information from the quantum chip 10.

Since the interposer 20 is disposed inside the countersunk hole 38, it is surrounded by the cooling base 30. Therefore, the cooling performance can be improved. Since a part of the mounting surface 21 of the interposer 20 is in contact with the stepped surface 39, and this feature can further improve the cooling performance. Further, it is possible to reduce the step (i.e., the difference in level) between the predetermined surface 32 and the opposite surface 22, and thereby to improve the degree of flexibility as to how the quantum device 3 is placed.

Third Modified Example

Figure 26:
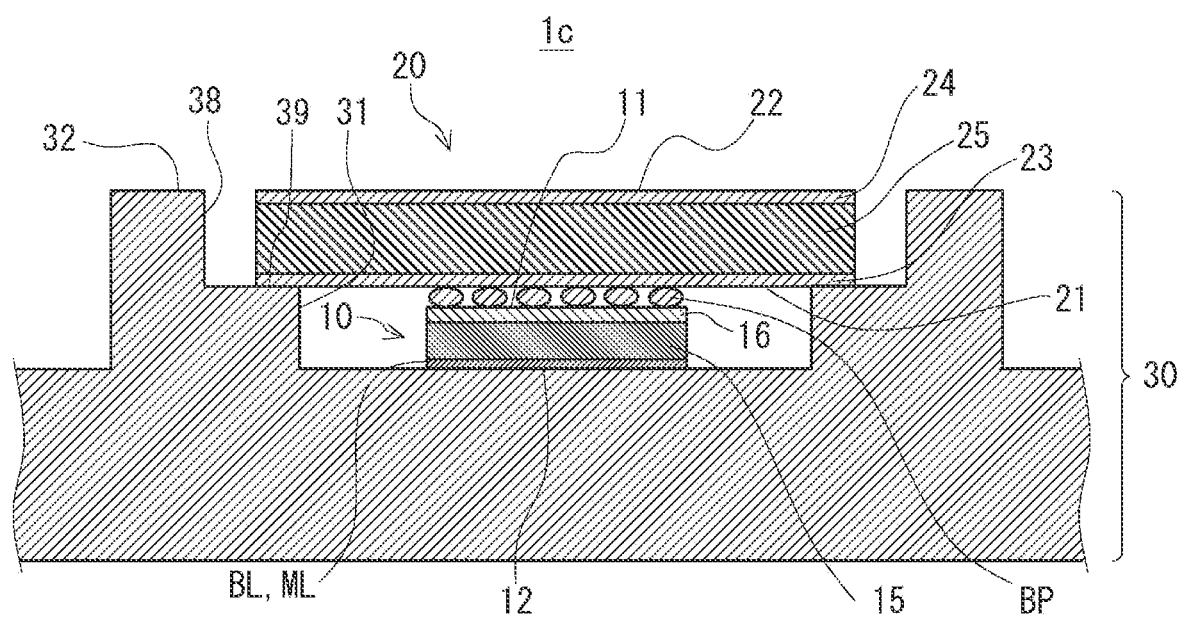
FIG. 26 is a cross-sectional view showing an example of a bonding layer or a junction layer according to a third modified example of the first example embodiment.

Next, a third modified example of the first example embodiment will be described. This modified example includes a bonding layer or a junction layer between the quantum chip 10 and the inner surface of the recessed part 31. FIG. 26 is a cross-sectional view showing an example of a bonding layer or a junction layer according to the third modified example of the first example embodiment. As shown in FIG. 26, in a quantum device 1c according to the third modified example, at least a part of the second surface 12 of the quantum chip 10 may be bonded or joined to the inner surface of the recessed part 31. For example, the second surface 12 may be bonded to the cooling base 30 by a bonding layer BL made of varnish, grease, or the like. Further, the second surface 12 may be joined by the cooling base 30 by using a junction layer ML, which is, for example, a metal layer, formed between the chip substrate 15 and the cooling base 30. By the above-described configuration, it is possible to improve the stability of the mounted quantum chip 10, and thereby to improve the accuracy of the position thereof. Further, the thermal connection with the cooling base 30 can be improved.

The bonding layer BL or the junction layer ML may be disposed over the entire surface of the second surface 12, or may be disposed on at least a part of the second surface 12, such as the periphery of the second surface 12 or the center of the second surface 12. For example, the bonding layer BL or the junction layer ML may be formed so as to avoid the area where the quantum circuit 17 is formed as viewed from above. In the case where the bonding layer BL is made of an insulating material, there is a risk that the bonding layer BL may act as a capacitor and resonate with the quantum circuit 17, causing a loss in the overall energy. It is possible to prevent or reduce the resonance by disposing the bonding layer BL so as to avoid the area where the quantum circuit 17 is formed.

Further, when the junction layer ML is electrically conductive such as when the junction layer ML is a metal layer, the ground potential of the quantum chip 10 may be obtained from the cooling base 30 through the junction layer ML, that is, the potential specified in the cooling base 30 may be obtained.

Fourth Modified Example

Figure 27:
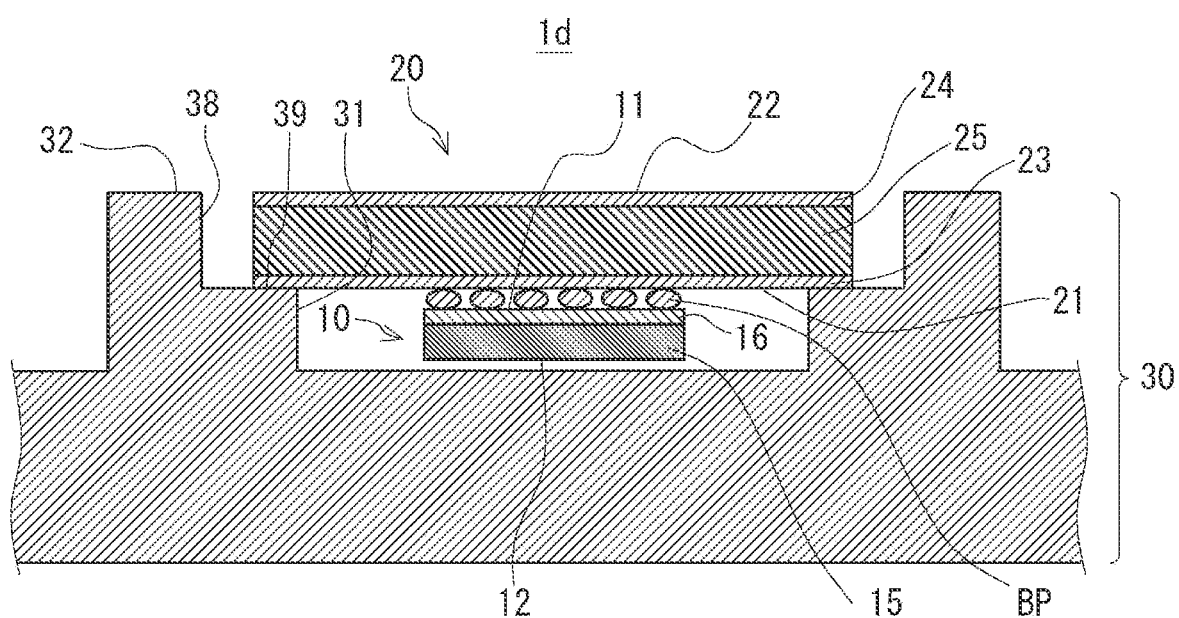
FIG. 27 is a cross-sectional view showing an example of a space between a quantum chip and an inner surface of the recessed part according to a fourth modified example of the first example embodiment.

Next, a fourth modified example of the first example embodiment will be described. In this modified example, there is a space between the quantum chip 10 and the inner surface of the recessed part 31. FIG. 27 is a cross-sectional view showing an example of a space between the quantum chip 10 and the inner surface of the recessed part 31 according to the fourth modified example of the first example embodiment. As shown in FIG. 27, in a quantum device 1d according to the fourth modified example, the quantum chip 10 does not have to be in contact with the cooling base 30. That is, the second surface 12 of the quantum chip 10 may be disposed in such a manner that a space is formed between the second surface 12 and the inner surface of the recessed part 31 of the cooling base 30. By the above-described configuration, it is possible to reduce the stress and the strain caused by the difference between the thermal contraction of the quantum chip 10 caused by the change of the temperature to an extremely low temperature and that of the cooling base 30.

Fifth Modified Example

Figure 28:
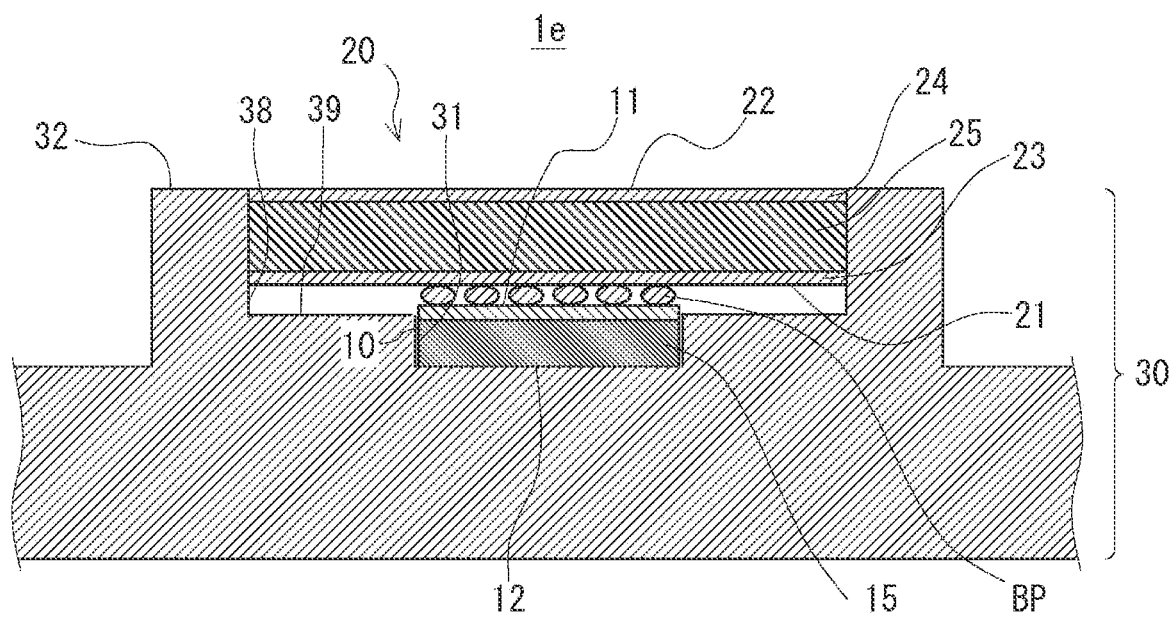
FIG. 28 is a cross-sectional view showing an example of a quantum device according to a fifth modified example of the first example embodiment.

Next, a quantum device according to a fifth modified example of the first example embodiment will be described. In the quantum device according to this example embodiment, the interposer 20 is in contact with the side surface of the countersunk hole 38. FIG. 28 is a cross-sectional view showing an example of the quantum device according to the fifth modified example of the first example embodiment. As shown in FIG. 28, in the quantum device 1e, the recessed part 31 of the cooling base 30 is formed in a predetermined surface 32 of the cooling base 30. Further, the countersunk hole 38 is formed around the mouth of the recessed part 31. As a result, a stepped surface 39 having a step (i.e., a difference in level) with respect to the predetermined surface 32 is formed around the mouth of the recessed part 31.

In the quantum device 1e according to this modified example, at least a part of the side surface of the interposer 20 is in contact with the side surface of the countersunk hole 38 that is located between the stepped surface 39 and the predetermined surface 32. Further, a part of the mounting surface 21 of the interposer 20 is disposed in such a manner that a space is formed between the part of the mounting surface 21 and the stepped surface 39. In this way, since the mounting surface 21 of the interposer 20 does not have to be in contact with the cooling base 30, it is possible to make full use of the mounting surface 21.

Further, in the quantum device 1e according to this modified example, the quantum chip 10 may be fitted into the recessed part 31 when it is cooled to an extremely low temperature. Therefore, the side surface of the quantum chip 10 may be in contact with the inner surface of the recessed part 31. As a result, since the quantum chip 10 is cooled by thermal conduction through its side surface, the cooling performance can be improved.

Note that when the quantum device 1e is cooled from a room temperature to an extremely low temperature in the order of several [mK], the volumes of the quantum chip 10, the interposer 20, and the cooling base 30 change. Therefore, the quantum device is configured (i.e., designed) while taking the volume changes into consideration in advance so that the side surface of the quantum chip 10 comes into contact with the recessed part 31 when it is cooled to an extremely low temperature. Further, the ground potential of the quantum chip 10 may be obtained from the cooling base 30 through the side surface of the quantum chip 10. Note that the side surface of the quantum chip 10 may not be in contact the inner surface of the recessed part 31.

Sixth Modified Example

Figure 29:
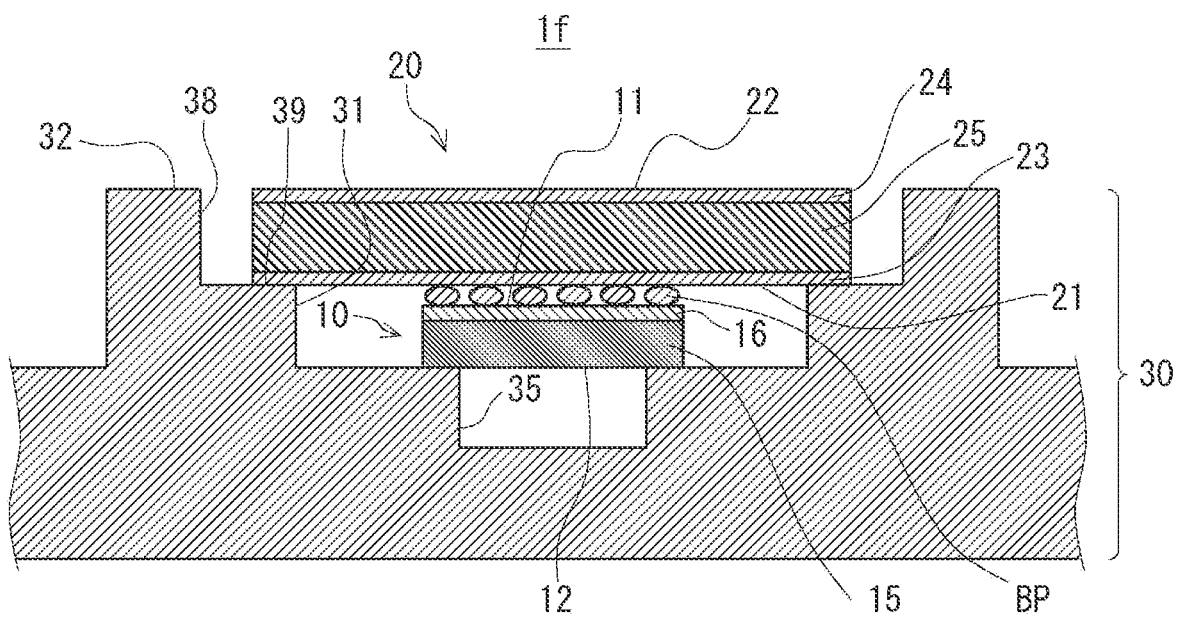
FIG. 29 is a cross-sectional view showing an example of a recess formed at the bottom of a recessed part of a cooling base according to a sixth modified example of the first example embodiment.
Figure 30:
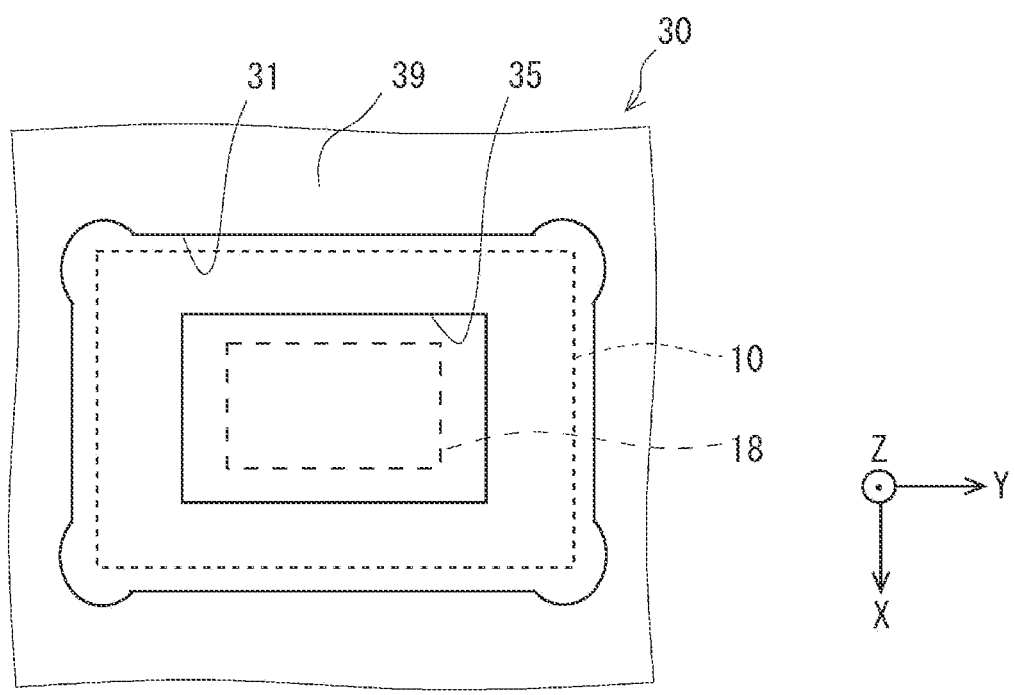
FIG. 30 is a plan view showing the example of the recess formed at the bottom of the recessed part of the cooling base according to the sixth modified example of the first example embodiment.

Next, a sixth modified example according to the first example embodiment will be described. In this modified example, a recess is provided (e.g., formed) at the bottom of the recessed part 31 of the cooling base 30. FIG. 29 is a cross-sectional view showing an example of a recess formed at the bottom of the recessed part 31 of the cooling base 30 according to the sixth modified example of the first example embodiment. FIG. 30 is a plan view showing the example of the recess formed at the bottom of the recessed part 31 of the cooling base 30 according to the sixth modified example of the first example embodiment. As shown in FIGS. 29 and 30, in a quantum device 1f according to the sixth modified example, a recess 35 is formed at the bottom of the recessed part 31. As shown in FIG. 30, the area of the recess 35 is larger than an area 18 in which the quantum circuit 17 is formed as viewed from above. Therefore, the area 18 where the quantum circuit 17 is formed is included in the area of the recess 35. The periphery of the second surface 12 of the quantum chip 10 may be in contact with the bottom of the recessed part 31. The central part of the second surface 12 of the quantum chip 10 covers the recess 35.

The area of recess 35 may be larger than the quantum chip 10 as viewed from above. In such a case, the second surface 12 of the quantum chip 10 is not in contact with the bottom of the recessed part 31.

In the quantum device 1f, as viewed from above, since the area of the recess 35 is larger than the area 18 in which the quantum circuit 17 is formed, it is possible to increase the distance between the area 18 in which the quantum circuit 17 is formed and the cooling base 30 containing a metal or the like. In this way, it is possible to prevent a pseudo capacitor from being formed and thereby to reduce the influence of the resonance that occurs in the main material, such as silicon, of the chip substrate 15. Therefore, it is possible to reduce the influence on the operating frequency of the quantum circuit 17.

Seventh Modified Example

Figure 31:
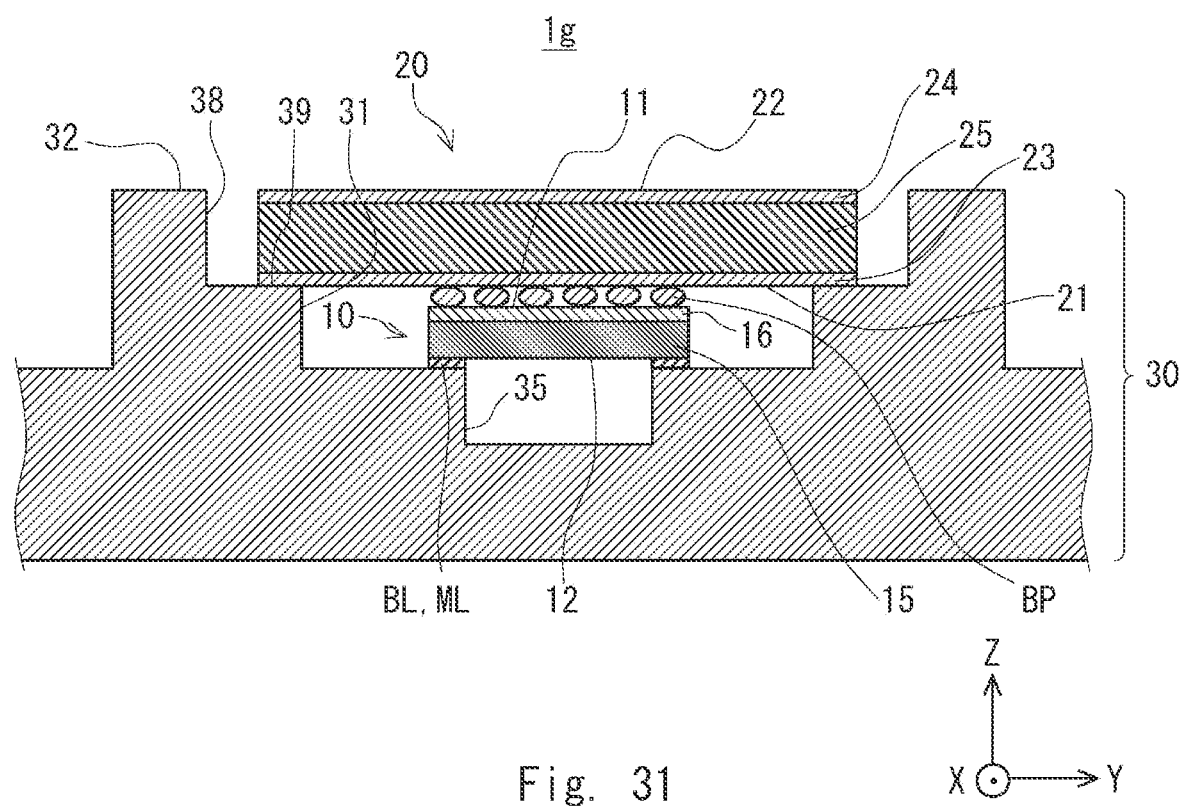
FIG. 31 is a cross-sectional view showing an example of a recess formed at the bottom of a recessed part of a cooling base according to a seventh modified example of the first example embodiment.

Next, a seventh modified example of the first example embodiment will be described. In this modified example, the periphery of the second surface 12 of the quantum chip 10 is bonded or joined to the periphery of the recess 35. FIG. 31 is a cross-sectional view showing an example of a recess formed at the bottom of the recessed part of the cooling base according to the seventh modified example of the first example embodiment. As shown in FIG. 31, in a quantum device 1g according to the seventh modified example, the periphery of the second surface 12 of the quantum chip 10 may be bonded to the bottom of the recessed part 31 by a bonding layer BL, or may be joined thereto by a junction layer ML, which is, for example, a metal layer. By the above-described configuration, it is possible to improve the stability of the mounted quantum chip 10 while reducing the influence of the resonance, and thereby to improve the accuracy of the position thereof. Further, the thermal connection with the cooling base 30 can be improved.

Eighth Modified Example

Figure 32:
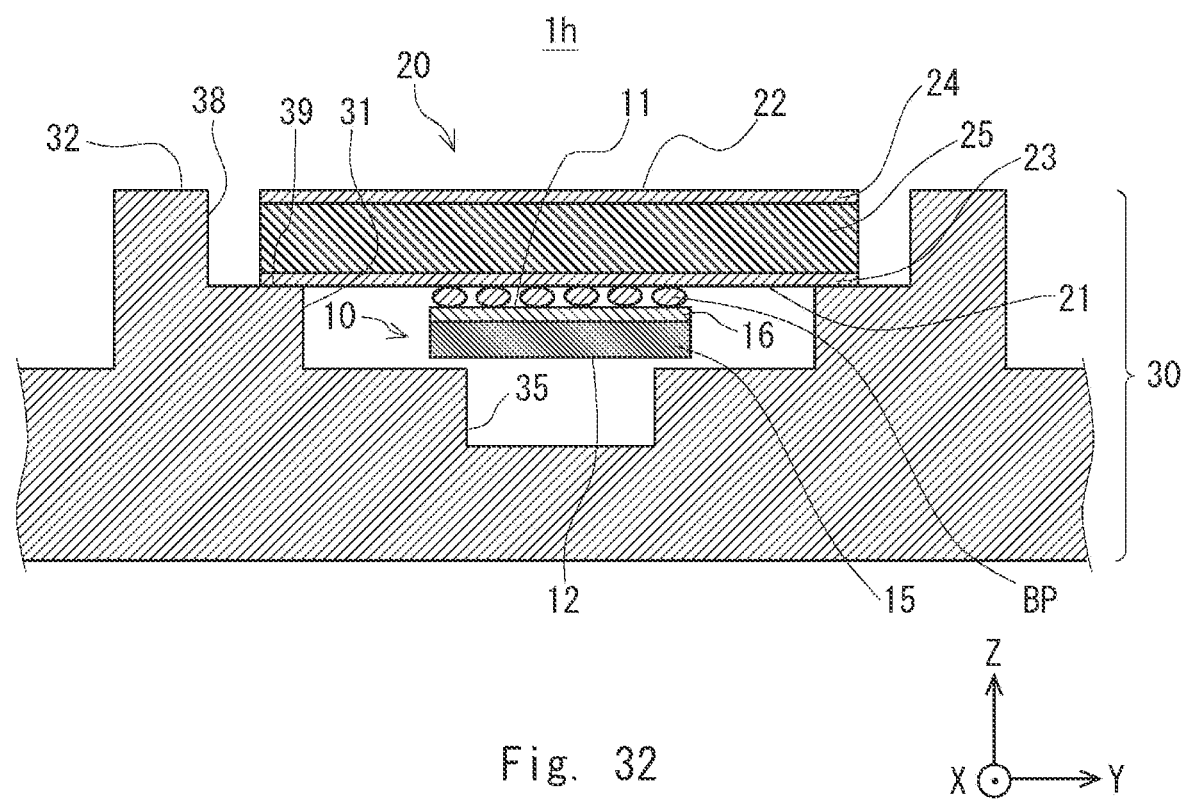
FIG. 32 is a cross-sectional view showing an example of a recess formed at the bottom of a recessed part of a cooling base according to an eighth modified example of the first example embodiment.

Next, an eighth modified example according to the first example embodiment will be described. This modified example includes a space between the periphery of the second surface 12 of the quantum chip 10 and the periphery of the recess 35. FIG. 32 is a cross-sectional view showing an example of a recess formed at the bottom of the recessed part of the cooling base according to the eighth modified example of the first example embodiment. As shown in FIG. 32, in a quantum device 1h according to the eighth modified example, the periphery of the second surface 12 of the quantum chip 10 does not have to be in contact with the cooling base 30. That is, the periphery of the second surface 12 of the quantum chip 10 may be disposed in such a manner that a space is formed between the periphery of the second surface 12 and the bottom of the recessed part 31. By the above-described configuration, it is possible to reduce the stress and the strain caused by the difference between the thermal contraction of the quantum chip 10 caused by the change of the temperature to an extremely low temperature and that of the cooling base 30 while reducing the influence of the resonance.

Ninth Modified Example

Figure 33:
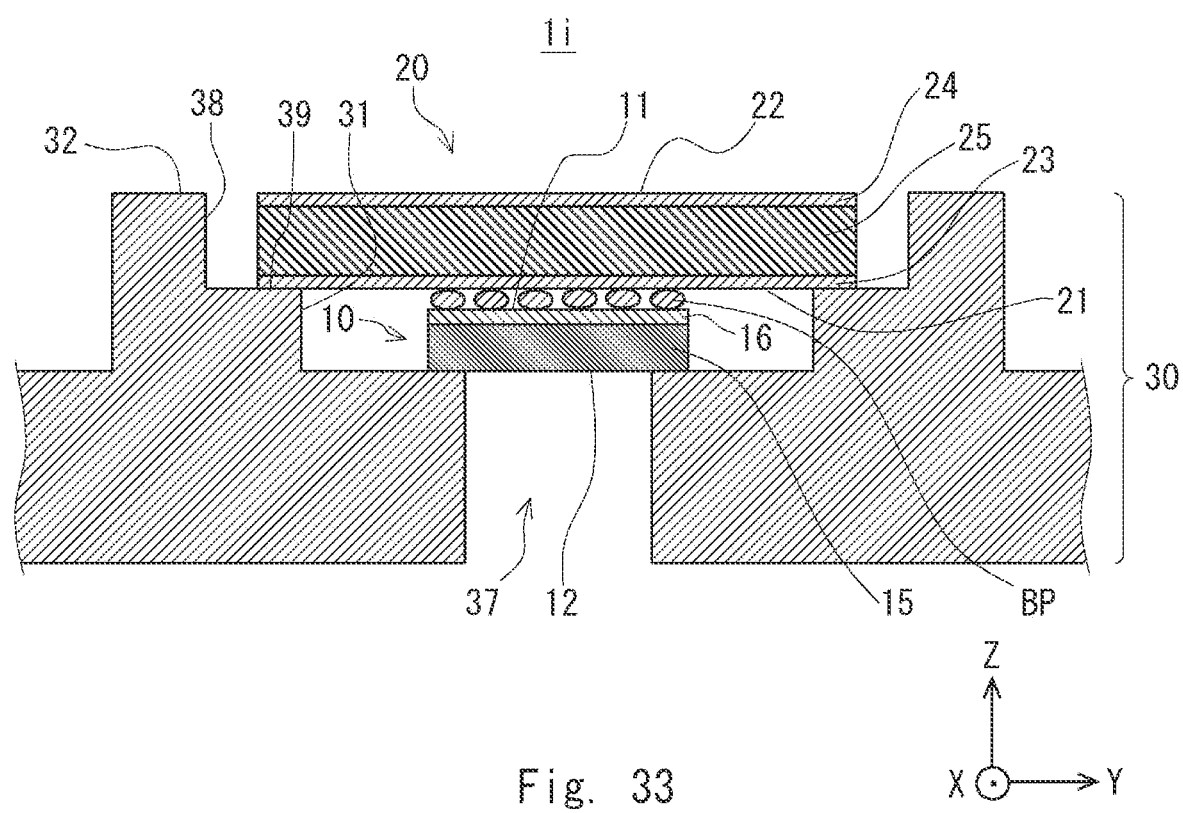
FIG. 33 is a cross-sectional view showing an example of a through hole formed at the bottom of a recessed part of a cooling base according to a ninth modified example of the first example embodiment.

Next, a ninth modified example according to the first example embodiment will be described. This modified example includes a through hole at the bottom of the recessed part 31 of the cooling base 30. FIG. 33 is a cross-sectional view showing an example of the through hole formed at the bottom of the recessed part 31 of the cooling base 30 according to the ninth modified example of the first example embodiment. As shown in FIG. 33, in a quantum device 1i according to the ninth modified example, a through hole 37 is formed at the bottom of the recessed part 31. The area of the through hole 37 is larger than the area 18 in which the quantum circuit 17 is formed as viewed from above. Therefore, the area 18 where the quantum circuit 17 is formed is included in the area of the through hole 37. The periphery of the second surface 12 of the quantum chip 10 may be in contact with the bottom of the recessed part 31, and/or may be bonded or joined to the bottom of the recessed part 31. The central part of the second surface 12 of the quantum chip 10 covers the through hole 37.

In the quantum device 1i, as viewed from above, since the area of the through hole 37 is larger than the area 18 in which the quantum circuit 17 is formed, it is possible to increase the distance between the area 18 in which the quantum circuit 17 is formed and the cooling base 30 containing a metal or the like. In this way, it is possible to reduce the influence of the resonance that occurs in the main material, such as silicon, of the chip substrate 15. Therefore, it is possible to reduce the influence on the operating frequency of the quantum circuit 17.

Tenth Modified Example

Figure 34:
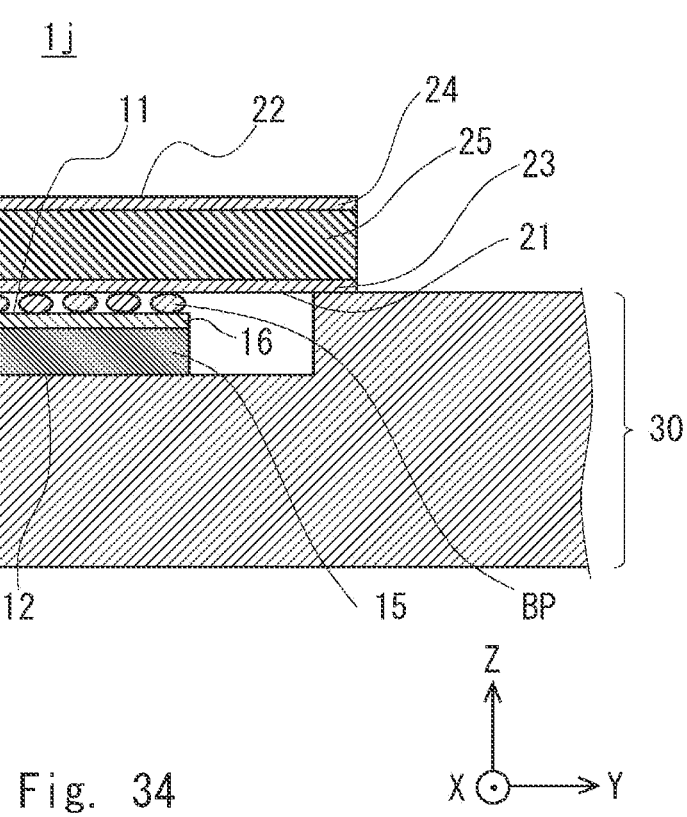
FIG. 34 is a cross-sectional view showing an example of a quantum element and a cooling base in a quantum device according to a tenth modified example of the first example embodiment.

In the second to ninth modified examples of the first example embodiment, an example in which the interposer 20 is provided on the stepped surface 39 of the countersunk hole 38 is shown, but the present disclosure is not limited thereto. The countersunk hole 38 may not be formed in the cooling base 30. A part of the mounting surface 21 of the interposer 20 may be in contact with the predetermined surface 32 of the cooling base 30. FIG. 34 is a cross-sectional view showing an example of a quantum element QE and a cooling base 30 in the quantum device according to a tenth modified example of the first example embodiment.

As shown in FIG. 34, a recessed part 31 is formed in the cooling base 30. For example, the recessed part 31 is formed in a predetermined surface 32 of the cooling base 30. The predetermined surface 32 is, for example, an upper surface that faces in the Z-axis positive direction. The recessed part 31 is open toward the Z-axis positive direction side. The recessed part 31 has, for example, a rectangular shape as viewed from above.

The quantum chip 10 is smaller than the recessed part 31 as viewed from above through the interposer 20 (i.e., as viewed while assuming that the interposer 20 is transparent). Meanwhile, the interposer 20 is larger than the recessed part 31 as viewed from above. The quantum chip 10 is disposed inside the recessed part 31. Meanwhile, a part of the interposer 20 is in contact with the cooling base 30. For example, a part of the mounting surface 21 of the interposer 20 on which the quantum chip 10 is mounted is in contact with the upper surface of the cooling base 30.

In order to prevent electrical conduction with the cooling base 30, an insulating film may be formed in the part of the mounting surface 21 of the interposer 20 that is in contact with the cooling base 30, or an insulating spacer is disposed in that part of the mounting surface 21 of the interposer 20. Further, no interposer wiring layer 23 may be formed in the part of the mounting surface 21 that is in contact with the cooling base 30.

By bringing at least a part of the interposer 20 into contact with the cooling base 30 and thereby using the interposer 20 as a heat flow path, it is possible to cool the quantum circuit 17 of the quantum chip 10 to an extremely low temperature and thereby to use a superconducting phenomenon.

Eleventh Modified Example

Figure 35:
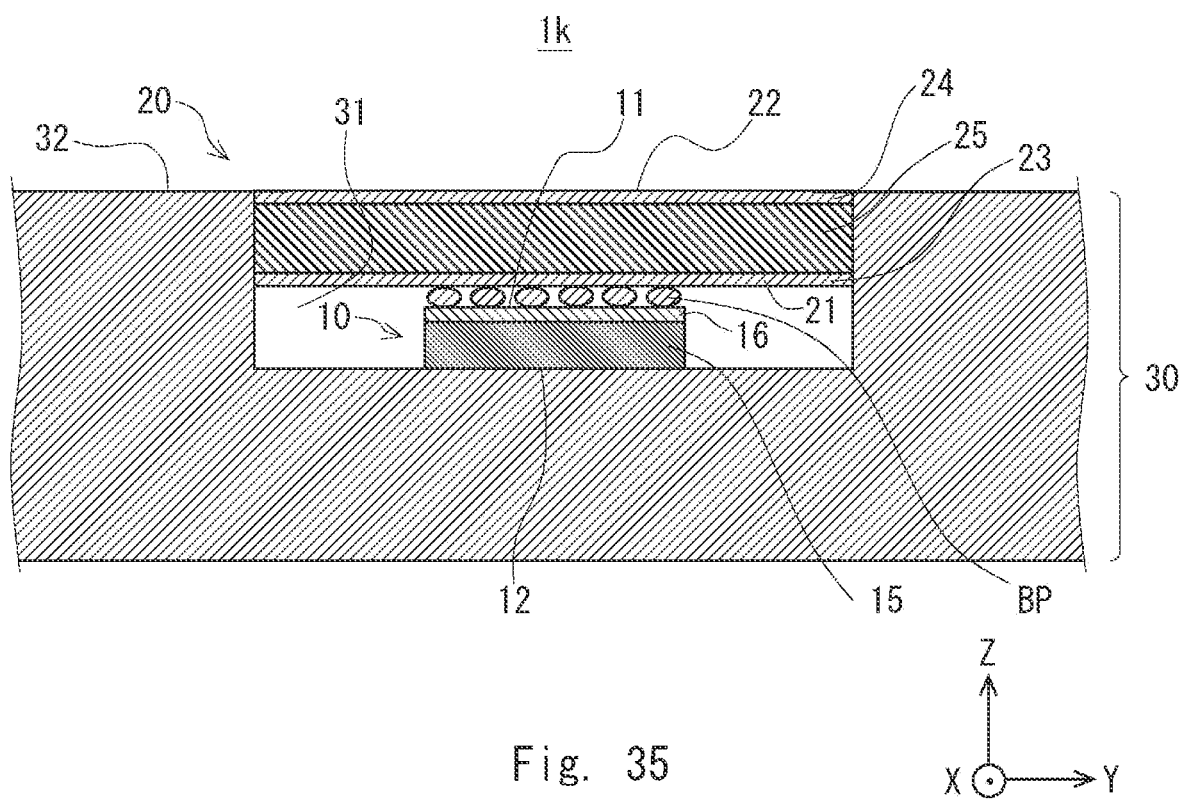
FIG. 35 is a cross-sectional view showing an example of a quantum element and a cooling base in a quantum device according to an eleventh modified example of the first example embodiment.

Next, a quantum device according to an eleventh modified example will be described. In the quantum device according to this modified example, the side surface of the interposer 20 is in contact with the inner surface of the recessed part 31. FIG. 35 is a cross-sectional view showing an example of a quantum device according to the eleventh modified example of the first example embodiment. As shown in FIG. 35, the quantum device 1k of modified example 11 includes a quantum chip 10 and an interposer 20, in a manner similar to the first example embodiment. However, in the quantum device 1k, at least a part of the side surface of the interposer 20 is in contact with the inner surface of the recessed part 31.

By the above-described configuration, since the mounting surface 21 of the interposer 20 does not have to be in contact with the cooling base 30, it is possible to make full use of the mounting surface 21. For example, the interposer wiring layer 23 can be formed on the mounting surface 21 to the maximum extent.

Twelfth Modified Example

Figure 36:
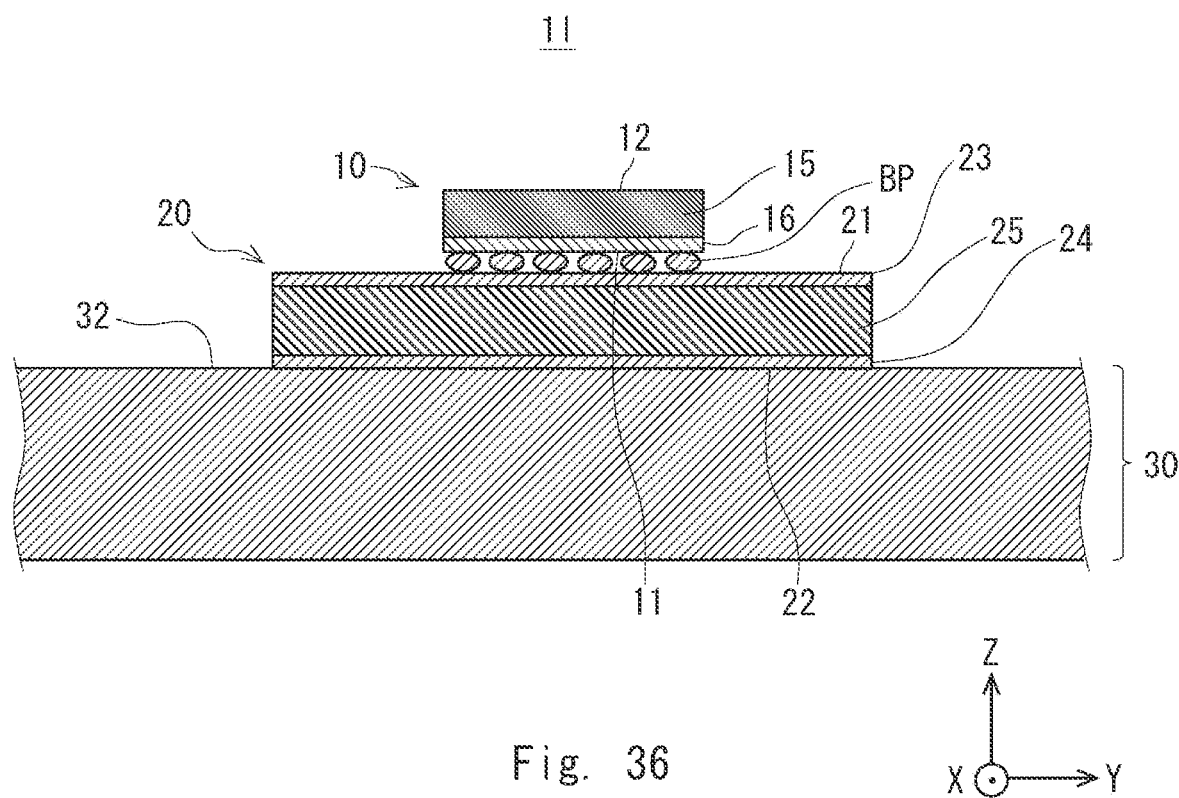
FIG. 36 is a cross-sectional view showing an example of a quantum element and a cooling base in a quantum device according to a twelfth modified example of the first example embodiment.

Next, a quantum device according to a twelfth modified example will be described. In the quantum device according to this modified example, the directions of the quantum chip 10 and the interposer 20 are upside down. FIG. 36 is a cross-sectional view showing an example of the quantum device according to the twelfth modified example of the first example embodiment. As shown in FIG. 36, in a quantum device 1l according to this modified example, an interposer 20 is disposed on a predetermined surface 32 of a cooling base 30. An opposite surface 22 of the interposer 20 is in contact with the predetermined surface 32 of the cooling base 30. An interposer wiring layer 24 may or may not be formed on the opposite surface 22. The mounting surface 21 of the interposer 20 faces upward.

The quantum chip 10 is disposed on the mounting surface 21 of the interposer 20. That is, a first surface 11 of the quantum chip 10 is mounted on the mounting surface 21 of the interposer 20. A second surface 12 of the quantum chip 10 faces upward. Therefore, in this modified example, a terminal surface QE1 may be a second surface 12 of the quantum chip 10. In this case, a terminal of the quantum element QE is formed on the second surface 12 of the quantum chip 10. The terminal surface QE1 may include a part other than the part where the quantum chip 10 is disposed on the mounting surface 21 of the interposer 20.

In the quantum device 1l according to this modified example, the degree of flexibility of the shape of the cooling base 30 can be improved. Further, contacts 47 of the socket 40 can be directly connected to terminals of the quantum chip 10. Thus, the quantum chip 10 can receive signals, electrical power, and the like from the socket 40, thereby reducing signal delay and power supply loss.

The present disclosure is not limited to the above-described example embodiments and the first to twelfth modified examples and changes can be made within the scope and spirit of the present disclosure. For example, a combination of any of the configurations and effects of the first example embodiment and the first to twelfth modified examples, and a configuration in which a plurality of quantum chips 10 are connected to one interposer 20 are also included in the scope of the technical idea according to the example embodiments.

The whole or part of the example embodiments disclosed above can be described as, but not limited to, the following supplementary notes.

(Supplementary Note 1)

A quantum device comprising:
a superconductive element including a superconductive material;
a socket including a contact and a housing, the contact being in contact with a terminal of the superconductive element, and the housing supporting the contact; and
a board including a board substrate, wherein
at least one of the housing and the board substrate includes a hole,
another one of the housing and the board substrate includes a fixing part disposed inside the hole and a body part other than the fixing part, and
the fixing part and the body part are integrally formed.

(Supplementary Note 2)

The quantum device described in Supplementary note 1, wherein
the terminal is formed on a terminal surface of the superconductive element, and
the fixing part has a cylindrical shape including a central axis in a direction orthogonal to the terminal surface.

(Supplementary Note 3)

The quantum device described in Supplementary note 1 or 2, wherein
the terminal is formed on the terminal surface of the superconductive element, and
the hole has a cylindrical shape including a central axis in the direction orthogonal to the terminal surface.

(Supplementary Note 4)

The quantum device described in Supplementary note 1, wherein
the terminal is formed on a terminal surface of the superconductive element, and
the fixing part has a shape having a longitudinal direction when viewed from a direction orthogonal to the terminal surface.

(Supplementary Note 5)

The quantum device described in Supplementary note 4, wherein
the fixing part has an elliptical shape when viewed from a direction orthogonal to the terminal surface.

(Supplementary Note 6)

The quantum device described in Supplementary note 4 or 5, wherein
the terminal is formed on the terminal surface of the superconductive element, and
the hole has a shape having a longitudinal direction when viewed from the direction orthogonal to the terminal surface.

(Supplementary Note 7)

The quantum device described in Supplementary note 6, wherein
the hole has an elliptical shape when viewed from the direction orthogonal to the terminal surface.

(Supplementary Note 8)

The quantum device described in Supplementary note 1, wherein
the terminal is formed on a terminal surface of the superconductive element,
a plurality of the holes and the fixing parts are provided,
a plurality of the contacts are provided, and
centers of gravity of the plurality of fixing parts and centers of gravity of the plurality of contacts are within a predetermined range when viewed in a direction orthogonal to the terminal surface.

(Supplementary Note 9)

The quantum device described in Supplementary note 8, wherein
the plurality of fixing parts are disposed at positions opposed to each other across the centers of gravity.

(Supplementary Note 10)

The quantum device described in Supplementary note 9, wherein
a direction in which one pair of the fixing parts is disposed at opposing positions is orthogonal to a direction in which another pair of the opposing fixing parts is opposed.

(Supplementary Note 11)

The quantum device described in any one of Supplementary notes 8 to 11, wherein
at least one of the fixing parts has a cylindrical shape including a central axis in the direction orthogonal to the terminal surface.

(Supplementary Note 12)

The quantum device described in any one of Supplementary notes 8 to 10, wherein
the fixing part has a shape having a longitudinal direction when viewed from the direction orthogonal to the terminal surface, and
the longitudinal direction of the plurality of fixing parts passes through the centers of gravity.

(Supplementary Note 13)

The quantum device described in any one of Supplementary notes 8 to 10, wherein
the fixing part has a shape having a longitudinal direction when viewed from the direction orthogonal to the terminal surface, and
a direction orthogonal to the longitudinal direction of the plurality of fixing parts passes through the centers of gravity.

(Supplementary Note 14)

The quantum device described in Supplementary note 12 or 13, wherein
the fixing part has an elliptical shape when viewed from a direction orthogonal to the terminal surface.

(Supplementary Note 15)

The quantum device described in any one of Supplementary notes 1 to 14, wherein
the fixing part includes a taper whose diameter expands toward a side of the body part.

(Supplementary Note 16)

The quantum device described in o any one of Supplementary notes 1 to 15, wherein
the housing includes at least any one of quartz, plastic aluminum oxide, mica-based machinable ceramic, aluminum nitride, zirconia, macol-based machinable ceramic, glass, and resin.

(Supplementary Note 17)

The quantum device described in Supplementary note 16, wherein
the housing includes a silica filler.

(Supplementary Note 18)

The quantum device described in any one of Supplementary notes 1 to 17, wherein
the board substrate includes at least one of epoxy, acrylic, urethane, polyimide, phenol, and liquid crystal polymer.

(Supplementary Note 19)

The quantum device described in Supplementary note 18, wherein the board substrate includes a filler selected from silica, an organic resin, and a ceramic, and a glass fiber.

(Supplementary Note 20)

The quantum device described in any one of Supplementary notes 1 to 19, wherein a part of at least one of the superconductive element, the housing, and the board substrate is in contact with a cooling base having a cooling function.

(Supplementary Note 21)

The quantum device described in any one of Supplementary notes 1 to 20, wherein the board substrate includes the hole, and the housing includes the fixing part and the body part.

(Supplementary Note 22)

The quantum device described in any one of Supplementary notes 1 to 20, wherein the housing includes the hole, and the board substrate includes the fixing part and the body part.

(Supplementary Note 23)

The quantum device described in any one of Supplementary notes 1 to 22, wherein the superconductive element is a quantum element provided with a quantum circuit.

(Supplementary Note 24)

The quantum device described in Supplementary note 23, wherein the quantum element comprises:

a quantum chip including at least a part of the quantum circuit; and an interposer on which the quantum chip is mounted, and the terminal is formed on an opposite side of a mounting surface of the interposer on which the quantum chip is mounted.

(Supplementary Note 25)

The quantum device described in Supplementary note 24, wherein the quantum chip is disposed inside a recessed part formed in the cooling base having a cooling function, and a part of the interposer is in contact with the cooling base.

(Supplementary Note 26)

The quantum device described in Supplementary note 25, wherein the quantum chip comprises a first surface and a second surface opposite to the first surface, the first surface being a surface that is opposed to the interposer when the quantum chip is mounted on the interposer, and at least a part of the second surface is in contact with an inner surface of the recessed part.

(Supplementary Note 27)

The quantum device described in Supplementary note 25, wherein the quantum chip comprises a first surface and a second surface opposite to the first surface, the first surface being a surface that is opposed to the interposer when the quantum chip is mounted on the interposer, and at least a part of the second surface is bonded or joined to an inner surface of the recessed part.

(Supplementary Note 28)

The quantum device described in Supplementary note 25, wherein the quantum chip comprises a first surface and a second surface opposite to the first surface, the first surface being a surface that is opposed to the interposer when the quantum chip is mounted on the interposer, and the second surface is disposed in such a manner that a space is formed between the second surface and an inner surface of the recessed part.

(Supplementary Note 29)

The quantum device described in Supplementary note 25, wherein the quantum chip comprises the quantum circuit in which pieces of a superconductive material are connected to each other in a circular manner by Josephson junctions, a recess is formed at a bottom of the recessed part, and an area where the quantum circuit is formed is included in an area of the recess as viewed in a direction perpendicular to a first surface of the quantum chip, the quantum chip being mounted on the interposer so that the first surface thereof is opposed to the interposer.

(Supplementary Note 30)

The quantum device described in Supplementary note 25, wherein the quantum chip comprises the quantum circuit in which a resonator is formed, the resonator comprising a loop circuit in which pieces of a superconductive material are connected to each other by a Josephson junction, a through hole is formed at a bottom of the recessed part, and an area in which the quantum circuit is formed is contained in an area of the through hole as viewed in a direction perpendicular to a first surface of the quantum chip, the first surface being the surface that is opposed to the interposer when the quantum chip is mounted on the interposer.

(Supplementary Note 31)

The quantum device described in any one of Supplementary notes 25 to 30, wherein the recessed part is formed in a predetermined surface of the cooling base, and a part of the mounting surface of the interposer on which the quantum chip is mounted is in contact with the predetermined surface.

(Supplementary Note 32)

The quantum device described in any one of Supplementary notes 25 to 30, wherein the recessed part is formed in a predetermined surface of the cooling base, and at least a part of a side surface of the interposer is in contact with an inner surface of the recessed part.

(Supplementary Note 33)

The quantum device described in any one of Supplementary notes 25 to 30, wherein the recessed part is formed in a predetermined surface of the cooling base, a stepped surface including a step with respect to the predetermined surface is formed around a mouth of the recessed part, and a part of the mounting surface of the interposer on which the quantum chip is mounted is in contact with the stepped surface.

(Supplementary Note 34)

The quantum device described in any one of Supplementary notes 25 to 30, wherein the recessed part is formed in a predetermined surface of the cooling base, a stepped surface including a step with respect to the predetermined surface is formed around a mouth of the recessed part, and at least a part of a side surface of the interposer is in contact with a side surface between the stepped surface and the predetermined surface.

(Supplementary Note 35)

The quantum device described in Supplementary note 34, wherein a part of a mounting surface of the interposer on which the quantum chip is mounted is disposed in such a manner that a space is formed between the part of the mounting surface and the stepped surface.

(Supplementary Note 36)

A quantum device comprising:

a superconductive element including a superconductive material;

a socket including a contact and a housing, the contact being in contact with a terminal of the superconductive element, and the housing supporting the contact; and a board including a board substrate, wherein a part of at least one of the superconductive element, the housing, and the board substrate comes into contact with a cooling base having a cooling function, at least one of the housing and the board substrate includes a first hole, another one of the housing and the board substrate includes a first fixing part disposed inside the first hole and a first body part other than the first fixing part, the first fixing part and the first body part are integrally formed, at least one of the cooling base and the board substrate includes a second hole, another one of the cooling base and the board substrate includes a second fixing part disposed inside the second hole and a second body part other than the second fixing part, and the second fixing part and the second body part are integrally formed.

(Supplementary Note 37)

The quantum device described in Supplementary note 36, wherein the terminal is formed on a terminal surface of the superconductive element, and the fixing part has a cylindrical shape including a central axis in a direction orthogonal to the terminal surface.

(Supplementary Note 38)

The quantum device described in Supplementary note 36 or 37, wherein the terminal is formed on the terminal surface of the superconductive element, and at least one of the first hole and the second hole has a cylindrical shape including a central axis in the direction orthogonal to the terminal surface.

(Supplementary Note 39)

The quantum device described in Supplementary note 36, wherein the terminal is formed on the terminal surface of the superconductive element, and at least one of the first fixing part and the second fixing part has a shape having a longitudinal direction when viewed from a direction orthogonal to the terminal surface.

(Supplementary Note 40)

The quantum device described in Supplementary note 39, wherein at least one of the first fixing part and the second fixing part has an elliptical shape when viewed from the direction orthogonal to the terminal surface.

(Supplementary Note 41)

The quantum device described in Supplementary note 39 or 40, wherein the terminal is formed on the terminal surface of the superconductive element, and at least one of the first hole and the second hole has a shape having the longitudinal direction when viewed from the direction orthogonal to the terminal surface.

(Supplementary Note 42)

The quantum device described in Supplementary note 41, wherein at least one of the first hole and the second hole has an elliptical shape when viewed from the direction orthogonal to the terminal surface.

(Supplementary Note 43)

The quantum device described in Supplementary note 36, wherein the terminal is formed on a terminal surface of the superconductive element, a plurality of the first holes and the first fixing parts are provided, a plurality of the second holes and the second fixing parts are provided, a plurality of the contacts are provided, and centers of gravity of the plurality of first fixing parts and second fixing parts and centers of gravity of the plurality of contacts are within a predetermined range when viewed in a direction orthogonal to the terminal surface.

(Supplementary Note 44)

The quantum device described in Supplementary note 43, wherein the plurality of first fixing parts and second fixing parts are disposed at positions opposed to other across the centers of gravity.

(Supplementary Note 45)

The quantum device described in Supplementary note 44, wherein a direction in which one pair of the first fixing parts are disposed at opposing positions is orthogonal to a direction in which another one pair of the opposing first fixing parts is opposed, and a direction in which one pair of the second fixing parts are disposed at opposing positions is orthogonal to a direction in which another one pair of the opposing second fixing parts is opposed.

(Supplementary Note 46)

The quantum device described in any one of Supplementary notes 43 to 45, wherein at least one of the first fixing part and the second fixing part has a cylindrical shape including a central axis in the direction orthogonal to the terminal surface.

(Supplementary Note 47)

The quantum device described in any one of Supplementary notes 43 to 46, wherein the first fixing part has a shape having a longitudinal direction when viewed from the direction orthogonal to the terminal surface, the second fixing part has a shape having the longitudinal direction when viewed from the direction orthogonal to the terminal surface, and the longitudinal direction of the plurality of first fixing parts and the longitudinal direction of the plurality of second fixing parts pass through the centers of gravity.

(Supplementary Note 48)

The quantum device described in any one of Supplementary notes 43 to 46, wherein
the first fixing part has a shape having a longitudinal direction when viewed from a direction orthogonal to the terminal surface,
the second fixing part has a shape having the longitudinal direction when viewed from the direction orthogonal to the terminal surface, and
a direction orthogonal to the longitudinal direction of the plurality of first fixing parts and a direction orthogonal to the longitudinal direction of the plurality of second fixing parts pass through the centers of gravity.

(Supplementary Note 49)

The quantum device described in Supplementary note 47 or 48, wherein
the fixing part has an elliptical shape when viewed from the direction orthogonal to the terminal surface.

(Supplementary Note 50)

The quantum device described in any one of Supplementary notes 36 to 49, wherein
the fixing part includes a taper whose diameter expands toward a side of the body part.

(Supplementary Note 51)

The quantum device described in any one of Supplementary notes 36 to 50, wherein
the housing includes at least any one of quartz, plastic aluminum oxide, mica-based machinable ceramic, aluminum nitride, zirconia, macol-based machinable ceramic, glass, and resin.

(Supplementary Note 52)

The quantum device described in Supplementary note 51, wherein
the housing includes a silica filler.

(Supplementary Note 53)

The quantum device described in any one of Supplementary notes 36 to 52, wherein
the board substrate includes at least one of epoxy, acrylic, urethane, polyimide, phenol, and liquid crystal polymer.

(Supplementary Note 54)

The quantum device described in Supplementary note 53, wherein
the board substrate includes a filler selected from silica, an organic resin, and a ceramic, or a glass fiber.

(Supplementary Note 55)

The quantum device described in any one of Supplementary notes 36 to 54, wherein
the board substrate includes the first hole, and
the housing comprises the first fixing part and the first body part,
the board substrate includes the second hole, and
the cooling base comprises the second fixing part and the second body part.

(Supplementary Note 56)

The quantum device described in any one of Supplementary notes 36 to 54, wherein
the housing includes the first hole, and
the board substrate comprises the first fixing part and the first body part,
the cooling base includes the second hole, and
the board substrate comprises the second fixing part and the second body part.

(Supplementary Note 57)

The quantum device described in any one of Supplementary notes 36 to 56, wherein
the superconductive element is a quantum element provided with a quantum circuit.

(Supplementary Note 58)

The quantum device described in Supplementary note 57, wherein
the quantum element comprises:
a quantum chip including at least a part of the quantum circuit; and
an interposer on which the quantum chip is mounted, and
the terminal is formed on an opposite side of a mounting surface of the interposer on which the quantum chip is mounted.

(Supplementary Note 59)

The quantum device described in Supplementary note 58, wherein
the quantum chip is disposed inside a recessed part formed in the cooling base having the cooling function, and
a part of the interposer is in contact with the cooling base.

(Supplementary Note 60)

The quantum device described in Supplementary note 59, wherein
the quantum chip comprises a first surface and a second surface opposite to the first surface, the first surface being a surface that is opposed to the interposer when the quantum chip is mounted on the interposer, and
at least a part of the second surface is in contact with an inner surface of the recessed part.

(Supplementary Note 61)

The quantum device described in Supplementary note 59, wherein
the quantum chip comprises a first surface and a second surface opposite to the first surface, the first surface being a surface that is opposed to the interposer when the quantum chip is mounted on the interposer, and
at least a part of the second surface is bonded or joined to an inner surface of the recessed part.

(Supplementary Note 62)

The quantum device described in Supplementary note 59, wherein
the quantum chip comprises a first surface and a second surface opposite to the first surface, the first surface being a surface that is opposed to the interposer when the quantum chip is mounted on the interposer, and
the second surface is disposed in such a manner that a space is formed between the second surface and an inner surface of the recessed part.

(Supplementary Note 63)

The quantum device described in Supplementary note 59, wherein
the quantum chip comprises the quantum circuit in which a resonator is formed, the resonator comprising a loop circuit in which pieces of a superconductive material are connected to each other by a Josephson junction,
a recess is formed at a bottom of the recessed part, and
an area in which the quantum circuit is formed is contained in an area of the recess as viewed in a direction perpendicular to the first surface of the quantum chip, the first surface being the surface that is opposed to the interposer when the quantum chip is mounted on the interposer.

(Supplementary Note 64)

The quantum device described in Supplementary note 59, wherein
the quantum chip comprises the quantum circuit in which a resonator is formed, the resonator comprising a loop circuit in which pieces of a superconductive material are connected to each other by a Josephson junction, a through hole is formed at a bottom of the recessed part, and an area in which the quantum circuit is formed is contained in an area of the through hole as viewed in a direction perpendicular to the first surface of the quantum chip, the first surface being the surface that is opposed to the interposer when the quantum chip is mounted on the interposer.

(Supplementary Note 65)

The quantum device described in any one of Supplementary notes 59 to 64, wherein the recessed part is formed in a predetermined surface of the cooling base, and a part of the mounting surface of the interposer on which the quantum chip is mounted is in contact with the predetermined surface.

(Supplementary Note 66)

The quantum device described in any one of Supplementary notes 59 to 64, wherein the recessed part is formed in a predetermined surface of the cooling base, and at least a part of a side surface of the interposer is in contact with an inner surface of the recessed part.

(Supplementary Note 67)

The quantum device described in any one of Supplementary notes 59 to 64, wherein the recessed part is formed in a predetermined surface of the cooling base, a stepped surface including a step with respect to the predetermined surface is formed around a mouth of the recessed part, and a part of the mounting surface of the interposer on which the quantum chip is mounted is in contact with the stepped surface.

(Supplementary Note 68)

The quantum device described in any one of Supplementary notes 59 to 64, wherein the recessed part is formed in a predetermined surface of the cooling base, a stepped surface including a step with respect to the predetermined surface is formed around a mouth of the recessed part, and at least a part of a side surface of the interposer is in contact with a side surface between the stepped surface and the predetermined surface.

(Supplementary Note 69)

The quantum device described in Supplementary note 68, wherein a part of a mounting surface of the interposer on which the quantum chip is mounted is disposed in such a manner that a space is formed between the part of the mounting surface and the stepped surface.

(Supplementary Note 70)

The quantum device described in any one of Supplementary notes 56 to 69, wherein at least one of the first hole and the second hole is a penetrating hole.

According to the present disclosure, it is possible to provide a quantum device capable of preventing contacts from being displaced.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A quantum device comprising:
   a superconductive element including a superconductive material;
   a socket including a contact and a housing, the contact being in contact with a terminal of the superconductive element, and the housing supporting the contact; and
   a board including a board substrate, wherein
   the housing includes a first end face from which a first end of the contact protrudes, and a second end face from which a second end of the contact protrudes,
   the board is disposed so as to be opposed to the second end face of the housing,
   the board substrate includes a hole,
   the housing includes a fixing part disposed inside the hole and a body part other than the fixing part, and
   the fixing part and the body part are integrally formed.

2. The quantum device according to claim 1, wherein
   the terminal is formed on a terminal surface of the superconductive element,
   a plurality of the holes and the fixing parts are provided,
   a plurality of the contacts are provided, and
   centers of gravity of the plurality of fixing parts and centers of gravity of the plurality of contacts are within a predetermined range when viewed in a direction orthogonal to the terminal surface.

3. The quantum device according to claim 2, wherein
   the plurality of fixing parts are disposed at positions opposed to each other across the centers of gravity.

4. The quantum device according to claim 2, wherein
   a direction in which one pair of the fixing parts is disposed at opposing positions is orthogonal to a direction in which another pair of the opposing fixing parts is opposed.

5. The quantum device according to claim 1, wherein
   the terminal is formed on the terminal surface of the superconductive element,
   the fixing part has a cylindrical shape including a central axis in a direction orthogonal to the terminal surface, and
   the hole has a cylindrical shape including a central axis in the direction orthogonal to the terminal surface.

6. The quantum device according to claim 1, wherein
   the terminal is formed on the terminal surface of the superconductive element,
   the fixing part has a shape having a longitudinal direction when viewed from a direction orthogonal to the terminal surface,
   the hole has a shape having the longitudinal direction when viewed from the direction orthogonal to the terminal surface.

7. The quantum device according to claim 2, wherein
   the fixing part has a shape having a longitudinal direction when viewed from a direction orthogonal to the terminal surface,
   the longitudinal direction of the plurality of fixing parts or a shorter direction orthogonal to the longitudinal direction passes through the centers of gravity.

8. The quantum device according to claim 1, wherein
   the housing includes at least any one of quartz, plastic aluminum oxide, mica-based machinable ceramic, aluminum nitride, zirconia, macol-based machinable ceramic, glass, and resin.

9. The quantum device according to claim 1, wherein the board substrate includes at least one of epoxy, acrylic, urethane, polyimide, phenol, and liquid crystal polymer.

10. A quantum device comprising:
a superconductive element including a superconductive material;
a socket including a contact and a housing, the contact being in contact with a terminal of the superconductive element, and the housing supporting the contact; and
a board including a board substrate, wherein
a part of at least one of the superconductive element, the housing, and the board substrate comes into contact with a cooling base having a cooling function,
at least one of the housing and the board substrate includes a first hole,
another one of the housing and the board substrate includes a first fixing part disposed inside the first hole and a first body part other than the first fixing part,
the first fixing part and the first body part are integrally formed,
at least one of the cooling base and the board substrate includes a second hole,
another one of the cooling base and the board substrate includes a second fixing part disposed inside the second hole and a second body part other than the second fixing part, and
the second fixing part and the second body part are integrally formed.

11. The quantum device according to claim 10, wherein the terminal is formed on a terminal surface of the superconductive element, and
the fixing part has a cylindrical shape including a central axis in a direction orthogonal to the terminal surface.

12. The quantum device according to claim 10, wherein the terminal is formed on a terminal surface of the superconductive element, and
at least one of the first hole and the second hole has a cylindrical shape including a central axis in a direction orthogonal to the terminal surface.

13. The quantum device according to claim 10, wherein the terminal is formed on a terminal surface of the superconductive element, and
at least one of the first fixing part and the second fixing part has a shape having a longitudinal direction when viewed from a direction orthogonal to the terminal surface.

14. The quantum device according to claim 13, wherein at least one of the first fixing part and the second fixing part has an elliptical shape when viewed from the direction orthogonal to the terminal surface.

15. The quantum device according to claim 13, wherein the terminal is formed on the terminal surface of the superconductive element, and
at least one of the first hole and the second hole has a shape having a longitudinal direction when viewed from the direction orthogonal to the terminal surface.

16. The quantum device according to claim 15, wherein at least one of the first hole and the second hole has an elliptical shape when viewed from the direction orthogonal to the terminal surface.

17. The quantum device according to claim 10, wherein the terminal is formed on a terminal surface of the superconductive element,
a plurality of the first holes and the first fixing parts are provided,
a plurality of the second holes and the second fixing parts are provided,
a plurality of the contacts are provided, and
centers of gravity of the plurality of first fixing parts and second fixing parts and centers of gravity of the plurality of contacts are within a predetermined range when viewed in a direction orthogonal to the terminal surface.

18. The quantum device according to claim 17, wherein the plurality of first fixing parts and second fixing parts are disposed at positions opposed to each other across the centers of gravity.

19. The quantum device according to claim 18, wherein a direction in which one pair of the first fixing parts are disposed at opposing positions is orthogonal to a direction in which another one pair of the opposing first fixing parts is opposed, and
a direction in which one pair of the second fixing parts are disposed at opposing positions is orthogonal to a direction in which another one pair of the opposing second fixing parts is opposed.

20. The quantum device according to claim 17, wherein at least one of the first fixing part and the second fixing part has a cylindrical shape including a central axis in the direction orthogonal to the terminal surface.

* * * * *